(12) United States Patent
Hallberg et al.

(10) Patent No.: US 11,999,307 B2
(45) Date of Patent: Jun. 4, 2024

(54) VEHICLE POWER SUPPLY SYSTEM

(71) Applicants: Ningbo Geely Automobile Research & Development Co., Ltd., Ningbo (CN); Zhejiang Geely Holding Group Co., Ltd., Zhejiang (CN)

(72) Inventors: Linus Hallberg, Säve (SE); Naveen Raja Rajarathinam, Gothenburg (SE)

(73) Assignees: Ningbo Geely Automobile Research & Development Co., Ningbo (CN); ZHEJIANG GEELY HOLDING GROUP CO., LTD., Zhejiang (CN)

( * ) Notice: Subject to any disclaimer, the term of this patent is extended or adjusted under 35 U.S.C. 154(b) by 36 days.

(21) Appl. No.: 17/982,751

(22) Filed: Nov. 8, 2022

(65) Prior Publication Data
US 2023/0064027 A1 Mar. 2, 2023

Related U.S. Application Data

(63) Continuation of application No. PCT/CN2021/087478, filed on Apr. 15, 2021.

(30) Foreign Application Priority Data

May 20, 2020 (EP) ..................................... 20175718

(51) Int. Cl.
*B60R 16/033* (2006.01)
*H02J 9/06* (2006.01)
(52) U.S. Cl.
CPC ............ *B60R 16/033* (2013.01); *H02J 9/061* (2013.01)
(58) Field of Classification Search
CPC .. B60R 16/033; H02J 9/061; B60L 2260/162; B60L 3/0046; B60L 3/0092; B60L 50/60;
(Continued)

(56) References Cited

U.S. PATENT DOCUMENTS

2010/0305792 A1* 12/2010 Wilk ........................ B60L 50/61
701/22
2012/0016547 A1* 1/2012 Aridome ................. B60L 58/14
180/65.265
(Continued)

FOREIGN PATENT DOCUMENTS

CN 110544978 A 12/2019
DE 102005004330 A1 8/2006
(Continued)

OTHER PUBLICATIONS

International Search Report from International Application No. PCT/CN2021/087478, dated Jul. 19, 2021, 2 pages.
(Continued)

*Primary Examiner* — Jared Fureman
*Assistant Examiner* — Michael J Warmflash
(74) *Attorney, Agent, or Firm* — Tucker Ellis LLP

(57) ABSTRACT

A vehicle power supply system provides redundant high-voltage and low-voltage power supply for an electric vehicle or a hybrid-electric vehicle. The power supply system includes first and second high-voltage battery units. A positive terminal of the first unit is connected to a positive power distribution arrangement and a positive terminal of the second unit is connected to a negative terminal of the first high-voltage battery unit via an intermediate power distribution arrangement, and a negative terminal of the second unit is connected to a negative power distribution arrangement. The system has a first bypass line connecting the positive power distribution arrangement with the intermediate power distribution arrangement, and a second bypass line connecting the negative power distribution arrangement with the intermediate power distribution arrangement.

15 Claims, 8 Drawing Sheets

(58) Field of Classification Search
CPC .......... B60L 50/64; B60L 50/66; B60L 58/10; B60L 58/18; B60L 58/19; B60L 58/20; B60L 58/21; B60L 50/50; Y02T 10/70
See application file for complete search history.

(56) References Cited

U.S. PATENT DOCUMENTS

| | | | | |
|---|---|---|---|---|
| 2014/0312828 | A1* | 10/2014 | Vo | H02J 7/0016 |
| | | | | 429/7 |
| 2015/0306973 | A1* | 10/2015 | Gunnerud | B60L 53/20 |
| | | | | 320/162 |
| 2016/0001665 | A1* | 1/2016 | Kim | H02M 3/01 |
| | | | | 363/21.02 |
| 2018/0105060 | A1* | 4/2018 | Mcquillen | B60L 58/21 |
| 2018/0272879 | A1* | 9/2018 | Lasagni | H02J 7/1423 |
| 2019/0176729 | A1* | 6/2019 | Link | B60L 58/22 |
| 2019/0256018 | A1* | 8/2019 | Taoka | B60L 58/19 |
| 2019/0283625 | A1* | 9/2019 | Eriksson | H02J 7/0024 |
| 2020/0338990 | A1* | 10/2020 | Jang | B60L 8/003 |
| 2023/0105731 | A1* | 4/2023 | Hallberg | B60L 58/20 |
| | | | | 307/10.1 |

FOREIGN PATENT DOCUMENTS

| | | |
|---|---|---|
| DE | 102011011798 A1 | 8/2012 |
| DE | 102011011800 A1 | 8/2012 |
| DE | 102015205278 A1 | 9/2016 |
| DE | 102015219589 A1 | 4/2017 |
| DE | 102018216437 A1 | 11/2019 |
| EP | 3566894 A1 | 11/2019 |
| GB | 2550955 A | 12/2017 |

OTHER PUBLICATIONS

Hongjie Tao et al., "Analysis of Redundance Scheme for Electric System of Power Centralized EMU Power Train", Railway Locomotive & Car, vol. 39, No. 4, Aug. 2019, 12 pages with translation.

* cited by examiner

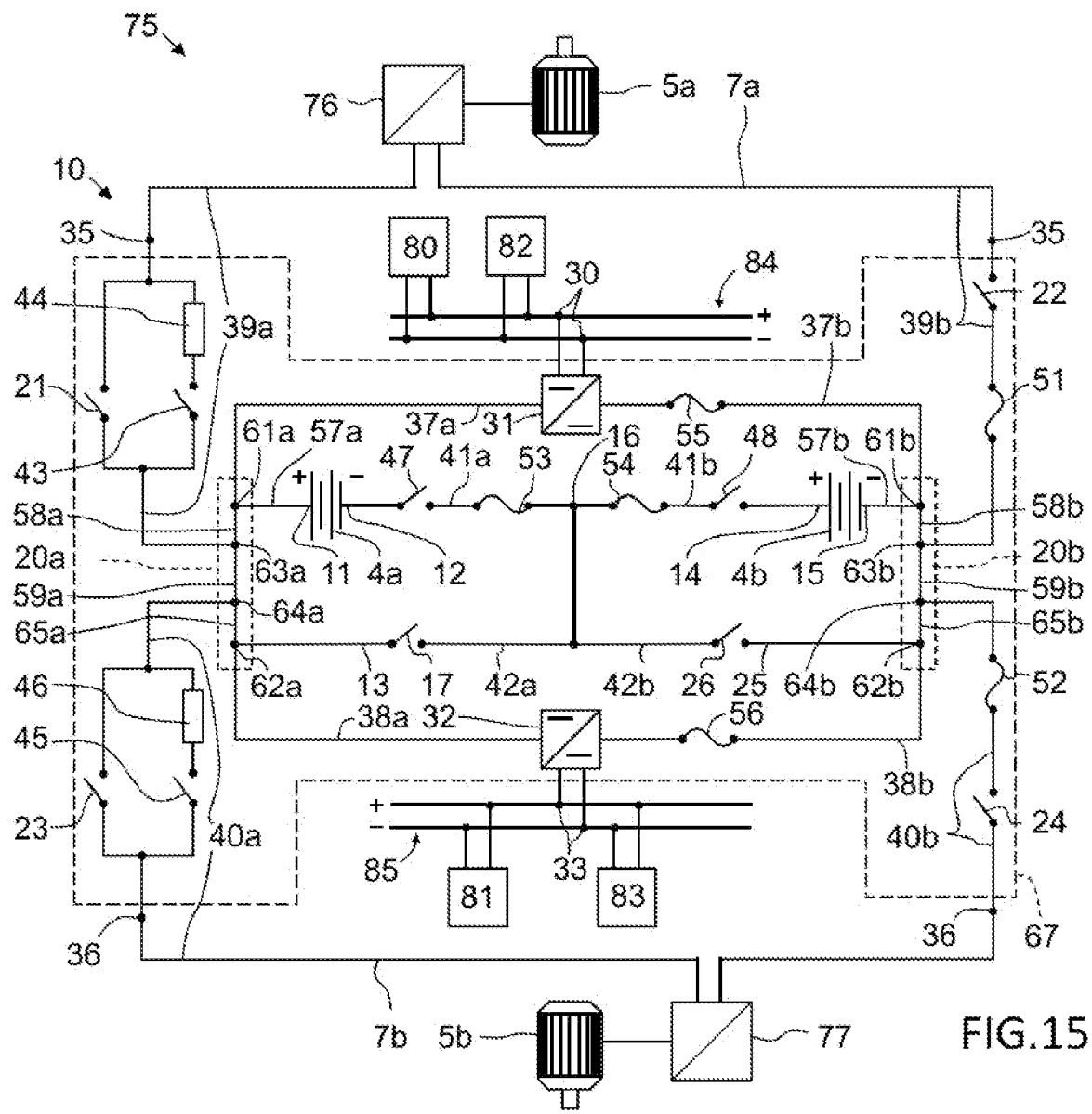
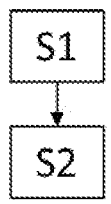
FIG.16

VEHICLE POWER SUPPLY SYSTEM

RELATED APPLICATION DATA

This application is a continuation of International Patent Application No. PCT/CN2021/087478, filed Apr. 15, 2021, which claims the benefit of European Patent Application No. 20175718.4, filed May 20, 2020, the disclosures of which are incorporated herein by reference in their entireties.

TECHNICAL FIELD

The present disclosure relates to a vehicle power supply system and a method for supplying redundant high-voltage and low-voltage electrical power to an electric vehicle or a hybrid-electric vehicle.

The system and method according to the disclosure can for example be arranged or implemented in an electric vehicle or hybrid-electric vehicle. Moreover, even if the system and method according to the disclosure will be described primarily in relation to a car, the system and method are not restricted to this particular vehicle, but may alternatively be installed or implemented in another type of vehicle where a highly redundant power supply system is desirable, such as a truck, a bus, a rail vehicle, a flying vehicle, a marine vessel, an off-road vehicle, a mining vehicle, an agriculture vehicle, a working vehicle such as a wheel loader or excavator, a forest vehicle such as harvesters or forwarders, a motorcycle or the like.

BACKGROUND

In the field of vehicle power supply system configured for providing redundant high-voltage and low-voltage power supply for an electric vehicle, there is a continuous demand for improved power supply reliability in combination with low overall vehicle cost-efficiency and low vehicle weight.

For example, document DE 102011011798 A1 shows a redundant vehicle power supply system for redundant high-voltage and low-voltage power supply for an electric vehicle. However, although this vehicle power supply system provides a certain level of redundancy in terms of the power supply, there is still a demand for further improved power supply reliability in combination with low overall vehicle cost-efficiency and low vehicle weight.

SUMMARY

An object of the present disclosure is to provide a vehicle power supply system and method for supplying redundant high-voltage and low-voltage electrical power to an electric vehicle or a hybrid-electric vehicle, where the previously mentioned problems are avoided. This object is at least partly achieved by the features of the independent claims.

According to a first aspect of the present disclosure, there is provided a vehicle power supply system configured for providing redundant high-voltage and low-voltage power supply for an electric vehicle or a hybrid-electric vehicle. The power supply system comprises a first high-voltage battery unit having a positive terminal and a negative terminal, wherein the positive terminal is connected to a positive power distribution arrangement. The power supply system further comprises a second high-voltage battery unit having a positive terminal and a negative terminal, wherein the positive terminal is connected to the negative terminal of the first high-voltage battery unit via an intermediate power distribution arrangement, and wherein the negative terminal is connected to a negative power distribution arrangement. The power supply system further comprises a first bypass line connecting the positive power distribution arrangement with the intermediate power distribution arrangement, and a second bypass line connecting the negative power distribution arrangement with the intermediate power distribution arrangement, wherein the first bypass line includes a first circuit breaker, and wherein the second bypass line includes a second circuit breaker. The power supply system additionally comprises a first DC/DC converter connected to the positive and negative power distribution arrangements and configured for providing a first low-voltage DC output, and a second DC/DC converter connected to the positive and negative power distribution arrangements and configured for providing a second low-voltage DC output. Moreover, the power supply system comprises a first main contactor connected to the positive power distribution arrangement and a second main contactor connected to the negative power distribution arrangement, wherein the first and second main contactors in engaged state are configured for connecting the first and second high-voltage battery units with a first high-voltage DC output, and in disengaged state configured for disconnecting the first and second high-voltage battery units from the first high-voltage DC output. Finally, the power supply system additionally comprises a third main contactor connected to the positive power distribution arrangement and a fourth main contactor connected to the negative power distribution arrangement, wherein the third and fourth main contactors in engaged state are configured for connecting the first and second high-voltage battery units with a second high-voltage DC output, and in disengaged state configured for disconnecting the first and second high-voltage battery units from the second high-voltage DC output.

According to a second aspect of the present disclosure, there is provided a method for supplying redundant high-voltage and low-voltage electrical power to an electric vehicle or a hybrid-electric vehicle. The method comprises a first step of providing first and second series connected high-voltage battery units mutually interconnected via an intermediate power distribution arrangement and connected to a positive power distribution arrangement and a negative power distribution arrangement, providing a first bypass line including a first circuit breaker, wherein the first bypass line is connected to the positive power distribution arrangement and to the intermediate power distribution arrangement, and providing a second bypass line including a second circuit breaker, wherein the second bypass line is connected to the negative power distribution arrangement and to the intermediate power distribution arrangement. The method further comprises a second step of supplying low-voltage DC at a first low-voltage DC output via a first DC/DC converter that is connected to the positive and negative power distribution arrangements and/or supplying low-voltage DC at a second low-voltage DC output via a second DC/DC converter that is connected to the positive and negative power distribution arrangements, and supplying high-voltage DC at a first high-voltage DC output via first and second main contactors that are connected to the positive and negative power distribution arrangements and/or supplying high-voltage DC at a second high-voltage DC output via third and fourth main contactors that are connected to the positive and negative power distribution arrangements.

In this way, several desirable technical effects are obtained. For example, by having a first and second series connected high-voltage battery units, each connected in parallel with a bypass line with a circuit breaker, any one of the first and second battery units may be individually bypassed, and thus effectively disconnected and isolated from the power supply system, in case of failure of the first or second battery unit, for example due to energy storage failure, capacity degradation, high-impedance, etc. As a result, electrical power may still be supplied despite an eventual failure of one of the first and second battery units.

Moreover, the series connection of the first and second battery unit enables a relatively high-voltage output in combination with low weight and low cost. For example, if each of the first and second battery unit have a nominal voltage output of for example approximately 400 Volt (V), the series connected battery units provide an output voltage of approximately 800 V, thereby enabling relatively high output power level and high charging power level. Furthermore, by designing the power supply system around merely two series connected battery units, a relatively low total weight and low total cost can be accomplished compared to conventional power supply systems that include multiple parallel connected battery units.

Moreover, a short-circuit of one of the battery units can generally be better handled by two series connected battery units than two parallel connected battery units, because two series connected batteries do not exhibit the current rush typically caused by battery short circuit when arranged in a parallel configuration.

Furthermore, by having the first and second high-voltage battery units and first and second bypass lines be connected to the positive and negative power distribution arrangement via an intermediate power distribution arrangement, a single fault, such as for example terminal connection failure, electrical cable or wire disruption, conductor insulation fault, or the like, associated with any of the high-voltage conductors connecting the first or second battery units with the intermediate power distribution arrangement and the positive and negative power distribution arrangement, merely isolates a the high-voltage battery associated with the single fault. In other words, the single fault does not result in total power supply failure, but merely a reduction in high-voltage supply level, thereby enabling continued power supply without the undesirable increased cost and weight typically associated with a plurality of parallel connected battery units.

In fact, according to some example embodiments, the power supply system according to the disclosure may include not more or less than two high-voltage battery units for vehicle propulsion purpose.

The electrical equipment and devices connected to the first and/or second high-voltage DC output can for example be configured to handle the reduced voltage output level of the power supply system caused by bypass of one of the first and second battery units.

In addition, by arranging the first and second DC/DC converters on the inside of the first to fourth main contactors, not only redundant low-voltage power supply is accomplished, but the vehicle power supply system may also maintain supply of low-voltage power to various low-voltage consumers supply by means of one or both of the DC/CD converters even if one or more of the first to fourth main contactors are set in open state. Consequently, supply of low-voltage power to for example safety critical consumers, such as vehicle steering or braking devices, may be kept operating independent from the operating state of the main contactors, fuses associated with the main contactors, or high-voltage cables associated with main contactors.

To conclude, the vehicle power supply system according to the disclosure, and associated method, clearly provide improved power supply reliability in combination with low overall vehicle cost-efficiency and low vehicle weight.

Further advantages are achieved by implementing one or several of the features of the dependent claims.

In some example embodiments, each of the positive and negative power distribution arrangements include one, two, three, four, five or six individual power distribution units for connecting: the positive terminal of the first high-voltage battery unit or the negative terminal of the second high-voltage battery unit, one of the first and second bypass lines, the first and second DC/DC converters, one of the first and second main contactors, and one of the third and fourth main contactors. An increased number of individual and separate power distribution units may when properly interconnected assist in avoiding a complete failure of the power supply system, and thus an improvement in terms of reliability.

According to some example embodiments, each of the positive and negative power distribution arrangements includes a first power distribution unit joining a high-voltage cable or conductor connected to or associated with the positive terminal of the first high-voltage battery unit or the negative terminal of the second high-voltage battery unit, with a high-voltage cable or conductor connected to or associated with the first DC/DC converter, and/or a high-voltage cable or conductor connected to or associated with the first or second main contactors. Thereby, a redundant wiring layout connecting the first and second high-voltage battery units with dual high-voltage and low-voltage outputs of the power supply system is enabled.

According to some example embodiments, each of the positive and negative power distribution arrangements includes a second power distribution unit joining a high-voltage cable or conductor associated with the first or second bypass line, with a high-voltage cable or conductor connected to or associated with the second DC/DC converter, and/or a high-voltage cable or conductor connected to or associated with the third or fourth main contactors. Thereby, a redundant wiring layout connecting the first and second high-voltage battery units with dual high-voltage and low-voltage outputs of the power supply system is enabled.

According to some example embodiments, each of the positive and negative power distribution arrangements includes a third power distribution unit joining a high-voltage cable or conductor connected to or associated with the first power distribution unit, with a high-voltage cable or conductor connected to or associated with the first or second main contactors or a high-voltage cable or conductor connected to or associated with the first DC/DC converter. Thereby, a redundant wiring layout connecting the first and second high-voltage battery units with dual high-voltage and low-voltage outputs of the power supply system is enabled.

According to some example embodiments, each of the positive and negative power distribution arrangements includes a fourth power distribution unit joining: a high-voltage cable or conductor connected to or associated with the third power distribution unit, with a high-voltage cable or conductor connected to or associated with the second power distribution unit, and with a high-voltage cable or conductor connected to or associated with the third or fourth main contactors or a high-voltage cable or conductor connected to or associated with the second DC/DC converter. Thereby, a redundant wiring layout connecting the first and second high-voltage battery units with dual high-voltage and low-voltage outputs of the power supply system is enabled.

According to some example embodiments, each of the positive and negative power distribution arrangements includes: a first power distribution unit joining a high-voltage cable or conductor connected to or associated with the first DC/DC converter and a high-voltage cable or conductor connected to or associated with the first or second main contactors, and a second power distribution unit joining a high-voltage cable or conductor connected to or associated with the second DC/DC converter and a high-voltage cable or conductor connected to or associated with the third or fourth main contactors. Thereby, an alternative redundant wiring layout connecting the first and second high-voltage battery units with dual high-voltage and low-voltage outputs of the power supply system is enabled.

According to some example embodiments, each of the positive and negative power distribution arrangements includes a third power distribution unit joining a high-voltage cable or conductor connected to or associated with the first power distribution unit and a high-voltage cable or conductor connected to or associated with the positive terminal of the first high-voltage battery unit or the negative terminal of the second high-voltage battery unit, and a fourth power distribution unit joining a high-voltage cable or conductor connected to or associated with the third power distribution unit, a high-voltage cable or conductor connected to or associated with the second power distribution unit, and a high-voltage cable or conductor associated with the first or second bypass lines. Thereby, a redundant wiring layout connecting the first and second high-voltage battery units with dual high-voltage and low-voltage outputs of the power supply system is enabled.

According to some example embodiments, the vehicle power supply system further comprises a third circuit breaker connected in series with the first high-voltage battery unit and configured for enabling selective connection and disconnection of the first high-voltage battery unit from the vehicle power supply system, and a fourth circuit breaker connected in series with the second high-voltage battery unit and configured for enabling selective connection and disconnection of the second high-voltage battery unit from the vehicle power supply system. Thereby, complete isolation of the first or second battery units is possible.

According to some example embodiments, the vehicle power supply system further comprises a first fuse connected in series with the first or second main contactors, a second fuse connected in series with the third or fourth main contactors, a third fuse connected in series with the first high-voltage battery unit, and a fourth fuse connected in series with the second high-voltage battery unit, wherein the first and second fuses have lower rated current value than the third and fourth fuses. Thereby, the risk for complete power loss is reduced.

According to some example embodiments, the first fuse has a rated current value differing at least 5%, specifically at least 10%, and more specifically at least 20%, from the rated current value of the second fuse, and/or wherein the third fuse has a rated current value differing at least 5%, specifically at least 10%, and more specifically at least 20%, from the rated current value of the fourth fuse. Thereby, the risk for complete power loss is reduced.

According to some example embodiments, the vehicle power supply system further comprises a fifth fuse connected in series with the first DC/DC converter and a sixth fuse connected in series with the second DC/DC converter, wherein the fifth fuse has a rated current value differing at least 5%, specifically at least 10%, and more specifically at least 20%, from the rated current value of the sixth fuse. Thereby, the risk for complete loss of low-voltage output is reduced.

According to some example embodiments, the power supply system may be installed within an interior space of a closed housing, and wherein the first and second low-voltage DC outputs and first and second high-voltage DC outputs are made available for connection on the outside of the housing. The housing provides improved packing, compactness, and protection of the power supply system.

The disclosure further relates to an electrical drivetrain for a vehicle comprising the vehicle power supply system as described above, wherein the electrical drivetrain comprises a first electrical traction motor connected to the first high-voltage DC output via a first power converter and a second electrical traction motor connected to the second high-voltage DC output via a second power converter. Dual electrical traction motors controlled by individual and separate power converters further increases the overall operating redundancy of the drivetrain.

The disclosure further relates to a vehicle comprising the electrical drivetrain as described above.

Further features and advantages of the invention will become apparent when studying the appended claims and the following description. The skilled person in the art realizes that different features of the present disclosure may be combined to create embodiments other than those explicitly described hereinabove and below, without departing from the scope of the present disclosure.

BRIEF DESCRIPTION OF THE DRAWINGS

The disclosure will be described in detail in the following, with reference to the attached drawings, in which FIG. 15 shows an example layout of a powertrain according to the disclosure, and FIG. 16 shows the basic steps of a method for supplying redundant high-voltage and low-voltage DC according to the disclosure.

DETAILED DESCRIPTION

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

Figure 1:
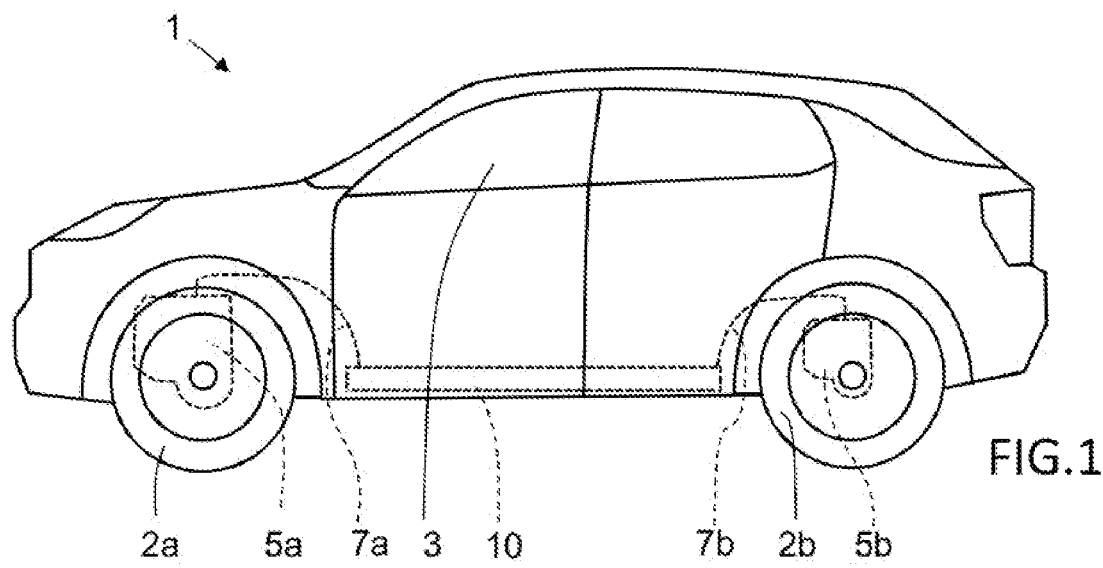
FIG. 1 shows schematically a side of an example embodiment of an electric vehicle having a power supply system according to the disclosure.

FIG. 1 schematically shows an electric vehicle 1 in form of a car having front wheels 2a, rear wheels 2b, a body with windows 3, and an electrical drivetrain for vehicle propulsion. The electrical drivetrain may be a pure electrical drivetrain, i.e. without internal combustion engine, or a hybrid electrical drivetrain, i.e. including an internal combustion engine. The vehicle power supply system according to the disclosure may advantageously be implemented in the vehicle for providing redundant high-voltage and low-voltage power supply to the various electrical consumers of the electric vehicle 1.

In the schematic illustration of FIG. 1, only some basic electrical components of the electrical drivetrain are shown, namely a vehicle power supply system 10 including a first high-voltage battery connected in series with a second high-voltage battery, a front electrical propulsion motor 5a drivingly connected to the front wheels 2a and electrically connected to one of the first and second high-voltage DC outputs of the power supply system via a high-voltage cable or conductor 7a, and a rear electrical propulsion motor 5b drivingly connected to the rear wheels 2b and electrically connected to one of the first and second high-voltage DC outputs of the power supply system via a high-voltage cable or conductor 7b.

The vehicle power supply system according to the disclosure is not restricted for implementation in a vehicle electrical drivetrain as described with reference to FIG. 1, but may alternatively be implemented in many other types of vehicle electrical drivetrains, which differs considerable in terms of layout and composition from the electrical drivetrain of FIG. 1. For example, the vehicle power supply system may be implemented in electrical drivetrains having merely one electrical propulsion motor, or electrical drivetrains having two rear wheel electrical propulsion motors and/or two front wheel electrical propulsion motors, or the like.

Figure 2:
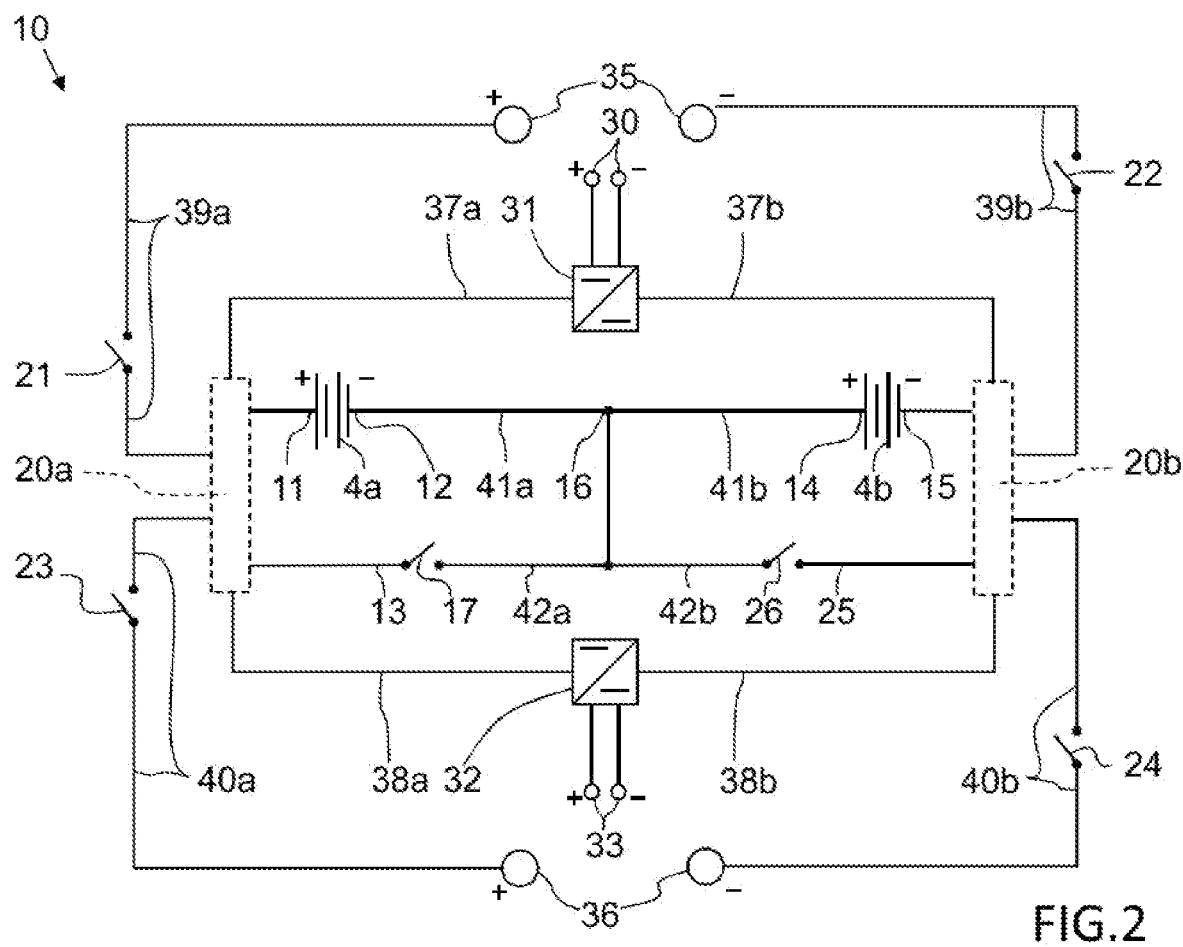
FIG. 2 shows schematically a general layout of an example embodiment of the power supply system according to the disclosure.

FIG. 2 shows a first example embodiment of the vehicle power supply system 10 configured for providing redundant high-voltage and low-voltage power supply for an electric vehicle 1 according to the disclosure. The vehicle power supply system 10 comprises a first high-voltage battery unit 4a having a positive terminal 11 and a negative terminal 12, wherein the positive terminal 11 is connected to a positive power distribution arrangement 20a. The vehicle power supply system 10 further comprises a second high-voltage battery unit 4b having a positive terminal 14 and a negative terminal 15, wherein the positive terminal 14 is connected to the negative terminal 12 of the first high-voltage battery unit 4a via an intermediate power distribution arrangement 16, and wherein the negative terminal 15 is connected to a negative power distribution arrangement 20b.

The vehicle power supply system 10 further comprises a first bypass line 13 connecting the positive power distribution arrangement 20a with the intermediate power distribution arrangement 16, and a second bypass line 25 connecting the negative power distribution arrangement 20b with the intermediate power distribution arrangement 16, wherein the first bypass line 13 includes a first circuit breaker 17, and wherein the second bypass line 25 includes a second circuit breaker 26.

The vehicle power supply system 10 further comprises a first DC/DC converter 31 connected to the positive and negative power distribution arrangements 20a, 20b and configured for providing a first low-voltage DC output 30, and a second DC/DC converter 32 connected to the positive and negative power distribution arrangements 20a, 20b and configured for providing a second low-voltage DC output 33.

Moreover, the vehicle power supply system 10 comprises a first main contactor 21 connected to the positive power distribution arrangement 20a and a second main contactor 22 connected to the negative power distribution arrangement 20b, wherein the first and second main contactors 21, 22 in engaged state are configured for connecting the first and second high-voltage battery units 4a, 4b with a first high-voltage DC output 35, and in disengaged state configured for disconnecting the first and second high-voltage battery units 4a, 4b from the first high-voltage DC output 35.

Finally, the vehicle power supply system 10 also comprises a third main contactor 23 connected to the positive power distribution arrangement 20a and a fourth main contactor 24 connected to the negative power distribution arrangement 20b, wherein the third and fourth main contactors 23, 24 in engaged state are configured for connecting the first and second high-voltage battery units 4a, 4b with a second high-voltage DC output 36, and in disengaged state configured for disconnecting the first and second high-voltage battery units 4a, 4b from the second high-voltage DC output 36.

The term "positive power distribution arrangement 20a" and "negative power distribution arrangement 20b" used herein refers to any kind of electrical connection arrangement for high-voltage power distribution between the conductors or cables that are connected thereto, i.e. a high-voltage connection splitter. Each of the positive and negative power distribution arrangements 20a, 20b may thus for example on one hand consist of a single multi-way electrical connector, or on the other hand include a plurality of individual three-way connectors that are mutually interconnected by means of high-voltage electrical conductors or cable, or an intermediate design including one or more individual three-way connectors in combination with one or more individual four-way, five-way or six-way connectors, or a plurality of individual four-way, five-way or six-way connectors, or the like.

The term "bypass line" used herein refers to high-voltage electrical conductor, such as a high-voltage cable. Hence, according to some example embodiments, the first bypass line 13 may be implemented in form of a first high-voltage electrical conductor or cable arrangement 42a including the first circuit breaker 17 and being connected to the positive power distribution arrangements 20a and to the intermediate power distribution arrangement 16, wherein the first circuit breaker 17 selectively sets the first bypass line 13 in conductive state or non-conductive state. Similarly, according to some example embodiments, the second bypass line 25 may be implemented in form of a second high-voltage electrical conductor or cable arrangement 42b including the second circuit breaker 26 and being connected to the negative power distribution arrangements 20b and to the intermediate power distribution arrangement 16, wherein the second circuit breaker 26 selectively sets the second bypass line 25 in conductive state or non-conductive state.

Moreover, the term "main contactor" used herein has the function of enabling connection and disconnection of the high-voltage battery pack of the vehicle from the remaining part of the electric drivetrain, e.g. electrical motor(s), inverter(s) or the like. The main contactors are thus typically switched to a closed (connected) stated upon starting the vehicle and they are typically controlled to remain in the closed state until the vehicle is shut-off, when they typically are switched to an open (disconnected) state.

The power supply system described above provide some advantageous aspects in terms of redundant and reliable power supply, resistance to negative effect caused by various types of single fault errors, cost-efficiency and relatively low weight.

First, the dual DC/DC converters 31, 32 provide redundant low-voltage supply, that will be maintained operational even of one of the first and second DC/DC converters 31, 32 would fail, or even if one of the high-voltage conductors or cables 37a, 37b connecting the positive and negative power distribution arrangements 20a, 20b with the first DC/DC converter 31 would fail, or even if one of the high-voltage conductors or cables 38a, 38b connecting the positive and negative power distribution arrangements 20a, 20b with the second DC/DC converter 32 would fail.

In addition, by arranging the first and second DC/DC converters 31, 32 on the inside of the first to fourth main contactors 21-24, not only redundant low-voltage power supply is accomplished, but the vehicle power supply system 10 may also maintain supply of low-voltage power to various low-voltage consumers supply by means of one or both of the DC/CD converters 31, 32 even if one or more of the first to fourth main contactors 21-24 are set in an open state, or if any of the high-voltage conductors or cables 39a, 39b connecting the positive and negative power distribution arrangements 20a, 20b with the first high-voltage DC/DC output 35 would fail, or if any of the high-voltage conductors or cables 40a, 40b connecting the positive and negative power distribution arrangements 20a, 20b with the second high-voltage DC/DC output 36 would fail, or if one or more fuses (not showed) associated with any of the first or second high-voltage DC/DC outputs 35, 36 would blow.

Consequently, supply of low-voltage power to for example safety critical consumers, such as vehicle steering or braking devices, may be kept operating independent from the operating state of the main contactors 21-24, single fault(s) relating to the high-voltage conductors or cables 39a, 39b, 40a, 40b of the first or second high-voltage DC/DC outputs 35, 36, and blown fuses associated with the first or second high-voltage DC/DC outputs 35, 36.

Moreover, by having a first high-voltage battery 4a series connected with the second high-voltage battery 4b, in combination with the first bypass line 13 with integrated first circuit breaker 17 being connected in parallel with the first high-voltage battery 4a, and the second bypass line 25 with integrated second circuit breaker 26 being connected in parallel with the second high-voltage battery 4b, any one of the first and second battery units 4a, 4b may easily be individually bypassed, and thus effectively disconnected and isolated from the rest of the power supply system 10, by appropriate setting of the first and second circuit breakers 17, 26.

Consequently, if for example the first battery unit 4a would fail due to for example high impedance or capacity degradation, the entire power supply is susceptible to complete failure due the series connected first and second battery units 4a, 4b. However, as a result of first and second bypass lines 13, 25 with integrated circuit breakers 17, 26, such a complete failure of the power supply system 10 may be prevented.

Specifically, the first circuit breaker 17, which during normal operating condition is set in open state, could in such a scenario be controlled to switch to a closed state, thereby providing a bypass route for electrical current. The current could then flow between the positive and negative power distribution arrangements 20a, 20b via the second high-voltage battery unit 2b, the intermediate power distribution arrangement 16, and the first bypass line 13.

As a result, electrical power may still be supplied at the first and second low-voltage DC outputs 30, 33 and first and second high-voltage DC outputs 35, 36 despite failure of one of the first and second battery units 4a, 4b, all while avoiding the undesirable heavy weight typically associated with redundancy accomplished by multiple parallel connected battery units.

In fact, the series connection of the first and second battery units 4a, 4b may even be advantageous in terms of output voltage level, because the series connection enables a relatively high-voltage output. For example, if each of the first and second battery unit have a nominal voltage output of about 400 V, the series connected batteries provide a 800 V output level, thereby enabling relatively high output power level, increased charging power level and relatively low weight of the high-power cables due to reduced current level by same power level, as derived from the equation "Power [Watt]=Voltage [V]×Current [I].

The voltage output level provided between the positive and negative power distribution arrangements 20a, 20b will be reduced, specifically substantially halved, upon bypass one of the first and second battery units 4a, 4b. For handling such reduction in voltage level, the first and second DC/DC converters 31, 32 may be configured for automatic adjustment of their operating setting for compensating for the reduced input voltage to the first and second DC/DC converters 31, 32, while maintaining a substantially constant low-voltage output level. Similarly, the electrical equipment and devices connected to the first and/or second high-voltage DC outputs 35, 36 may be configured to automatically compensate for the reduced high-voltage output level of the power supply system 10.

Moreover, a short-circuit of one of the first and second battery units 4a, 4b can generally be better handled by two series connected battery units than two parallel connected battery units, because two series connected batteries do generally not exhibit the current rush inherently caused by battery short circuit when arranged in a parallel configuration. Hence, a short-circuit of one of the first and second battery units 4a, 4b in the power supply system according to the disclosure may be overcome by simply bypassing the short-circuited battery unit, without need for handling a potentially harmful current rush through multiple parallel connected battery units.

Furthermore, by having the first and second high-voltage battery units 4a, 4b and first and second bypass lines 13, 25 be connected to the positive and negative power distribution arrangements 20a, 20b via an intermediate power distribution arrangement 16, a single fault, such as for example terminal connection failure, electrical cable or wire disruption, conductor insulation fault, or the like, associated with any of the high-voltage conductors 41a, 41b connecting the positive and negative power distribution arrangements 20a, 20b with the intermediate power distribution arrangement 16 via the first or second battery units 4a, 4b, would not result in a complete loss of high-voltage power, but merely disconnection of one of the first and second high-voltage battery units 4a, 4b, while the other of the first and second high-voltage battery units 4a, 4b would remain connected with the first and second high-voltage DC outputs 35, 36 and the first and second DC/DC converters 31, 32.

The intermediate power distribution arrangement 16 may according to some example embodiments be implemented in form of a single high-voltage power distribution unit, e.g. a high-voltage splitter, having for example three or four connection interfaces for receiving and mutually connecting the high-voltage conductors and/or cables associated with the first and second battery units 4a, 4b and the first and second bypass lines 13, 25. Alternatively, the intermediate power distribution arrangement 16 may according to other example embodiments be implemented in form of a multiple interconnected individual high-voltage power distribution units, as describe below with reference to FIG. 8. In other words, the intermediate power distribution arrangement 16 may consist of a single high-voltage power distribution unit, or comprise a plurality of individual connector units, for mutually connecting the high-voltage conductors 41a, 41b and first and second high-voltage electrical conductor or cable arrangement 42a, 42b.

Implementing the intermediate power distribution arrangement 16 as a single high-voltage power distribution unit provides the advantage of ensuring proper bypass connectivity even if one or more of the high-voltage conductors or cables 41a, 41b, 42a, 42b connected thereto exhibit a failure, such as connection failure, electrical cable or wire disruption, conductor insulation fault, or the like.

On the other hand, implementing the intermediate power distribution arrangement 16 by means of two or more individual connector units may, if properly arranged, provide the advantage of ensuring proper bypass connectivity even if one of said two or more individual connector units exhibit a failure, such as mechanical or thermal breakdown, or the like.

Figure 3:
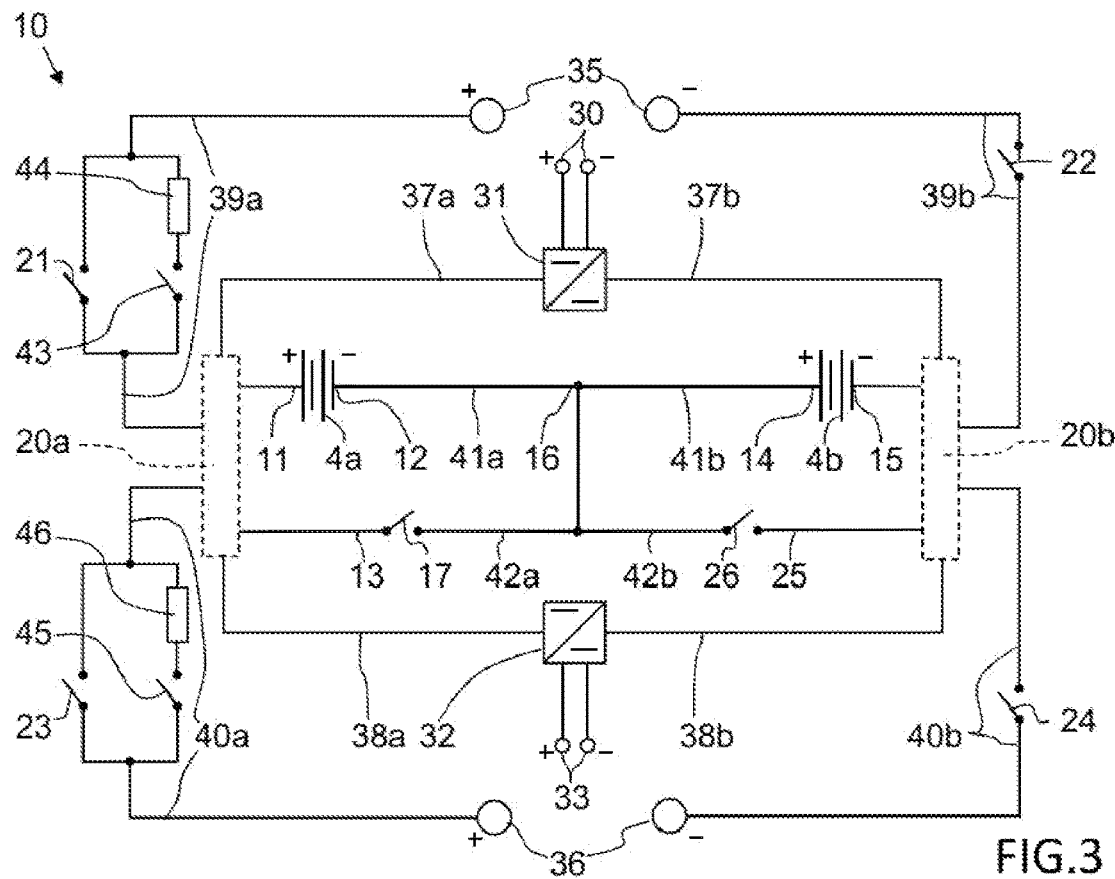
FIG. 3-6 show schematically various alternative or modified example embodiments of the power supply system according to the disclosure.

With reference to FIG. 3, the power supply system may according to some example embodiments, in addition to the power supply system described with reference to FIG. 2, be provided with a first precharge relay 43 arranged in parallel with the first or second main contactor 21, 22. The first precharge relay 43 is used, together with a series connected first precharge resistor 44, to temporarily charge for example a filter capacitor of a power inverter (not showed) connected to the first high-voltage DC output 35, to a level of typically 90-98% of the battery voltage. Thereby, the first and second main contactors 21, 22 are protected from an excess inrush current upon closing of the first and second main contactors 21, 22 at start-up of the vehicle.

Similarly, for the same reason, the power supply system may additionally be provided with a second precharge relay 45 arranged in parallel with the third or fourth main contactor 23, 24. The second precharge relay 45 is used, together with a series connected second precharge resistor 46, to temporarily charge for example a filter capacitor of a power inverter (not showed) connected to the second high-voltage DC output 36, to a level of typically 90-98% of the battery voltage. Thereby, the third and fourth main contactors 23, 24 are protected from an excess inrush current upon closing of the third and fourth main contactors 23, 24 at start-up of the vehicle.

Figure 4:
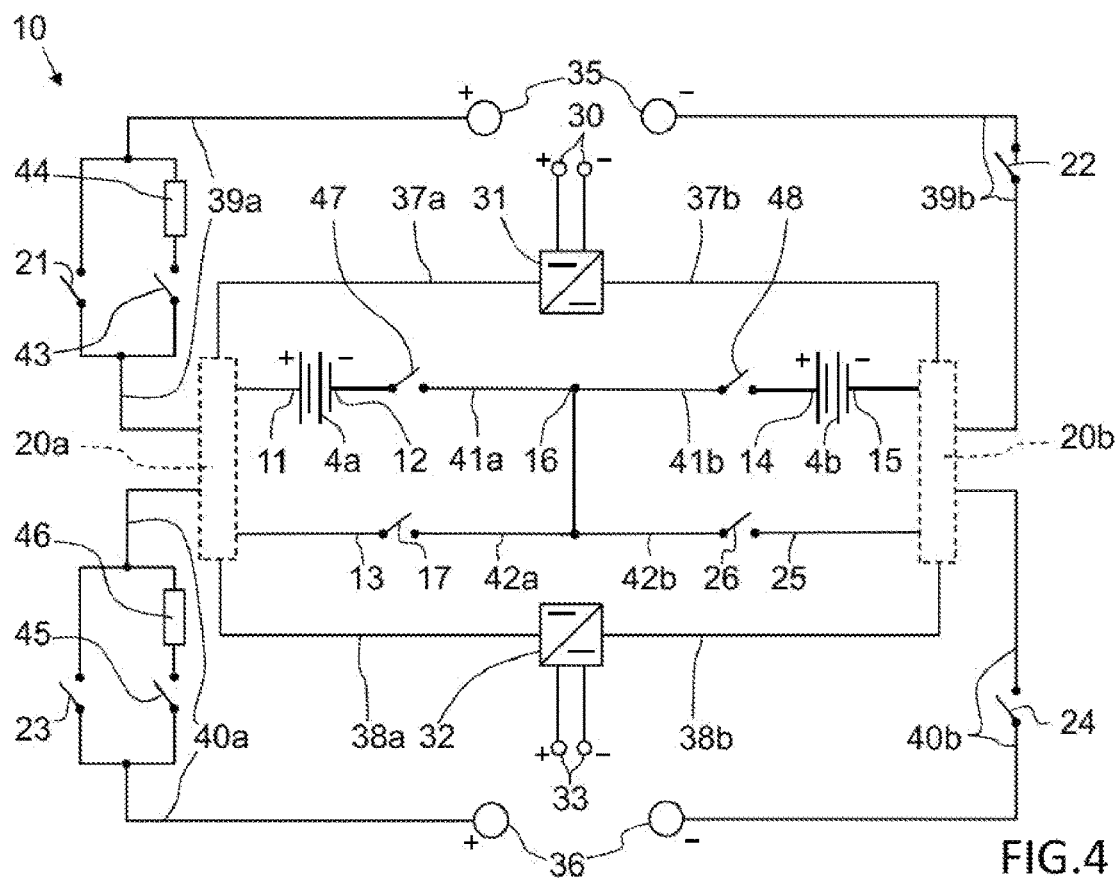

With reference to FIG. 4, the power supply system 10 may according to some example embodiments, in addition to the power supply system described with reference to any of FIGS. 2-3, be provided with a third circuit breaker 47 connected in series with the first high-voltage battery unit 4a and configured for enabling selective connection and disconnection of the first high-voltage battery unit 4a from the vehicle power supply system 10, and a fourth circuit breaker 48 connected in series with the second high-voltage battery unit 4b and configured for enabling selective connection and disconnection of the second high-voltage battery unit 4b from the vehicle power supply system 10.

Specifically, the third circuit breaker 47 may be arranged anywhere in the high-voltage conductor 41a connecting the positive power distribution arrangement 20a with the intermediate power distribution arrangement 16, and the fourth circuit breaker 48 may be arranged anywhere in the high-voltage conductor 41b connecting the negative power distribution arrangement 20b with the intermediate power distribution arrangement 16.

The third and fourth circuit breakers 47, 48 may be used for properly isolating the first or second battery unit 4a, 4b from the power supply system, for example upon a failure of the first or second battery unit 4a, 4b, such as energy storage failure, capacity degradation, thermal runaway, etc.

Figure 5:
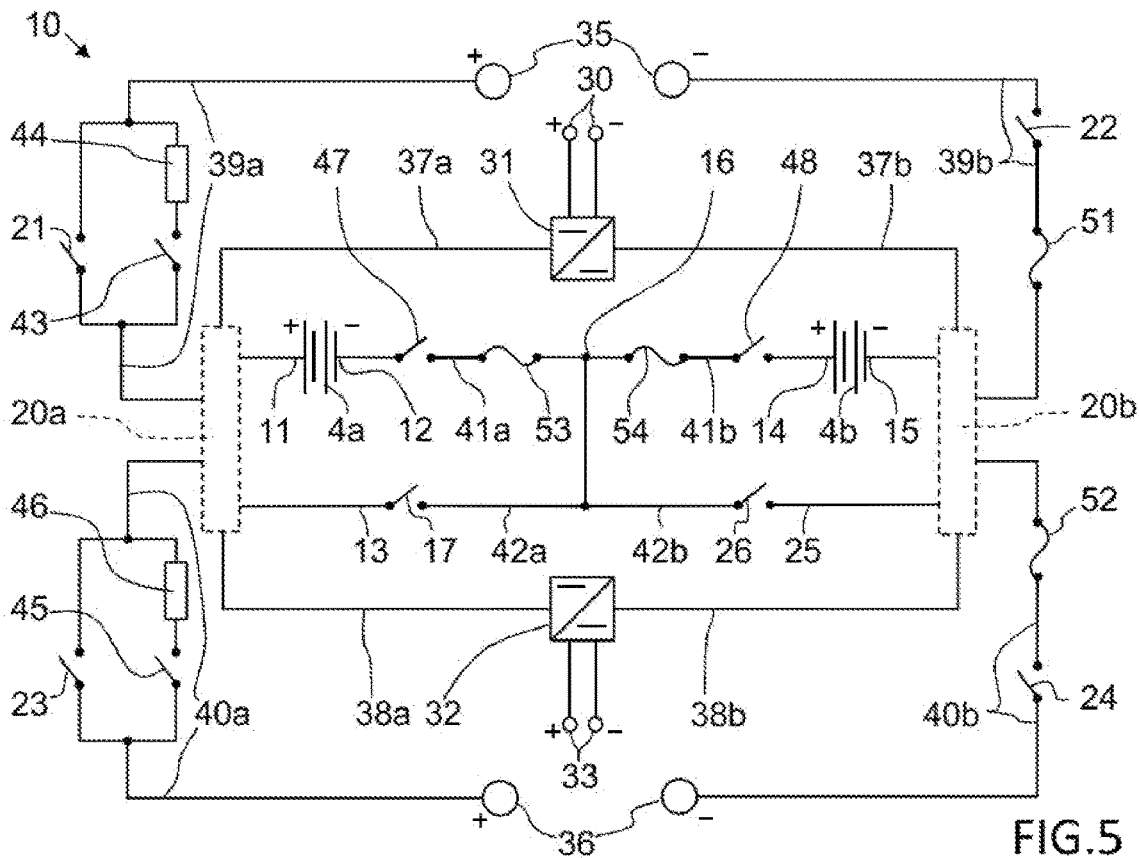

With reference to FIG. 5, the power supply system 10 may according to some example embodiments, in addition to the power supply system described with reference to any of FIGS. 2-4, be provided with a first fuse 51 connected in series with the first or second main contactor 21,22, a second fuse 52 connected in series with the third or fourth main contactor 23, 24, a third fuse 53 connected in series with the first high-voltage battery unit 4a, and a fourth fuse 54 connected in series with the second high-voltage battery unit 4b, wherein the first and second fuses 51, 52 have lower rated current value than the third and fourth fuses 53, 54.

Specifically, the first fuse 51 may be arranged in one of the high-voltage conductors or cables 39a, 39b connecting the positive and negative power distribution arrangements 20a, 20b with the first high-voltage DC/DC output 35, and the second fuse 52 may be arranged in one of the high-voltage conductors or cables 40a, 40b connecting the positive and negative power distribution arrangements 20a, 20b with the second high-voltage DC/DC output 36.

More specifically, the first fuse 51 may be arranged in the high-voltage conductor or cable 39a connecting the positive power distribution arrangements 20a with the first high-voltage DC/DC output 35, and the second fuse 52 may be arranged in the high-voltage conductor or cable 40a connecting the positive power distribution arrangements 20a with the second high-voltage DC/DC output 36. Alternatively, the first fuse 51 may be arranged in the high-voltage conductor or cable 39b connecting the negative power distribution arrangement 20b with the first high-voltage DC/DC output 35, and the second fuse 52 may be arranged in the high-voltage conductor or cable 40b connecting the negative power distribution arrangement 20b with the second high-voltage DC/DC output 36.

Moreover, the third fuse 53 may be arranged anywhere in the high-voltage conductor 41a connecting the positive power distribution arrangement 20a with the intermediate power distribution arrangement 16, and the fourth fuse 54 may be arranged anywhere in the high-voltage conductor 41b connecting the negative power distribution arrangement 20b with the intermediate power distribution arrangement 16.

The term "rated current value" means herein the maximum current that the fuse can continuously conduct without interrupting the circuit at a certain ambient temperature, such as 25° C.

The fact that the first and second fuses 51, 52 have lower rated current value than the third and fourth fuses 53, 54 have among others generally the effect that a relatively high current, such as an overload current or short-circuit current or the like, flowing through at least one of the first and second fuses 51, 52 and through at least one of the third and fourth fuses 53, 54 generally results in breaking of one of the first and second fuses 51, 52, while the third and fourth fuses 53, 54 generally remain intact and operating. This may desirable because thereby the functionality of the first and second battery units 4a, 4b is prioritized over supply to one of the first and second high-voltage DC/DC outputs 35, 36.

In other words, be selecting first and second fuses 51, 52 to have lower rated current value than the third and fourth fuses 53, 54, one or both of the first and second fuses 51, 52 are generally blown before the third and/or fourth fuses 53, 54, thereby avoiding a complete failure of the power supply system, because the first and second DC/DC converters 31, 32 may then remain functional for ensuring maintained power supply to any safety critical low-voltage consumer, such as steering or braking. Hence, even if the propulsion part of the power supply system 10 would fail, the safety critical low-voltage consumer would still be maintained operational.

A short-circuit current flowing through at least one of the first and second fuses 51, 52 and through the third and fourth fuses 53, 54 may for example occur in case of undesired short-circuit contact between the positive terminal of first high-voltage DC/DC output 35 or a high-voltage conductors or cables connected thereto and the negative terminal of the second high-voltage DC/DC output 36 or a high-voltage conductors or cables connected thereto.

According to some example embodiments, each of the first and second fuses 51, 52 has at least 5%, specifically at least 10%, lower rated current value than each of the third and fourth fuses 53, 54. Thereby, the functionality of the first and second battery units 4a, 4b are prioritized over supply to one of the first and second high-voltage DC/DC outputs 35, 36.

Furthermore, according to some example embodiments, the first fuse 51 has a rated current value differing at least 5%, specifically at least 10%, and more specifically at least 20%, from the rated current value of the second fuse 52. Thereby, the risk that both the first and second fuses 51, 52 blow essentially simultaneously may be reduced, in the event of an over current or short-circuit current would happen to flow through both the first and second fuses 51, 52 simultaneously. Consequently, the difference in rated current value between the first and second fuses 51, 52 essentially improves the likelihood that at least one of said first and second fuses 51, 52 remains intact in case of over current or short-circuit current, such that at least one of the first and second high-voltage DC/DC outputs 35, 36 may remain operational.

Furthermore, according to some example embodiments, the third fuse 53 has a rated current value differing at least 5%, specifically at least 10%, and more specifically at least 20%, from the rated current value of the fourth fuse 54. Thereby, the risk that both the third and fourth fuses 53, 54 blow essentially simultaneously may be reduced, in the event of an over current or short-circuit current would happen to flow through both the third and fourth fuses 51, 52 simultaneously. Consequently, the difference in rated current value between the third and fourth fuses 53, 54 essentially improves the likelihood that at least one of said third and fourth fuses 53, 54 remains intact in case of over current or short-circuit current, such that at least one of the first and second battery units 4a, 4b may remain connected and operational.

Figure 6:
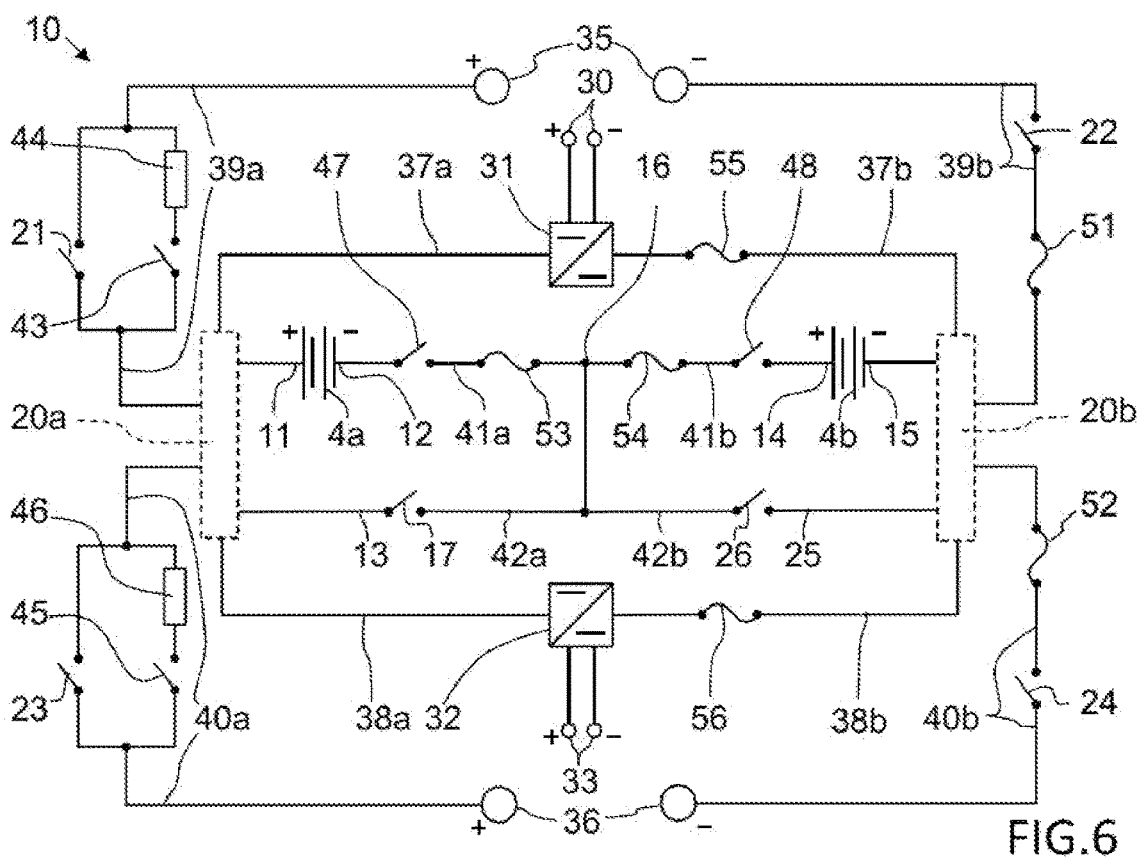

With reference to FIG. 6, the power supply system 10 may according to some example embodiments, in addition to the power supply system described with reference to any of FIGS. 2-5, be provided with a fifth fuse 55 connected in series with the first DC/DC converter 31 and a sixth fuse 56 connected in series with the second DC/DC converter 32, wherein the fifth fuse 55 has a rated current value differing at least 5%, specifically at least 10%, and more specifically at least 20%, from the rated current value of the sixth fuse 56. As described above, the setup with differing rated current values between the fifth and sixth fuses 55, 56 results in reduced risk that both the fifth and sixth fuses 55, 56 blow essentially simultaneously, in the event of an over current or short-circuit current would happen to flow through both the fifth and sixth fuses 55, 56 simultaneously. Consequently, the difference in rated current value between the fifth and sixth fuses 55, 56 essentially improves the likelihood that at least one of first and second DC/DC converters 31, 32 may remain operational.

Figure 7:
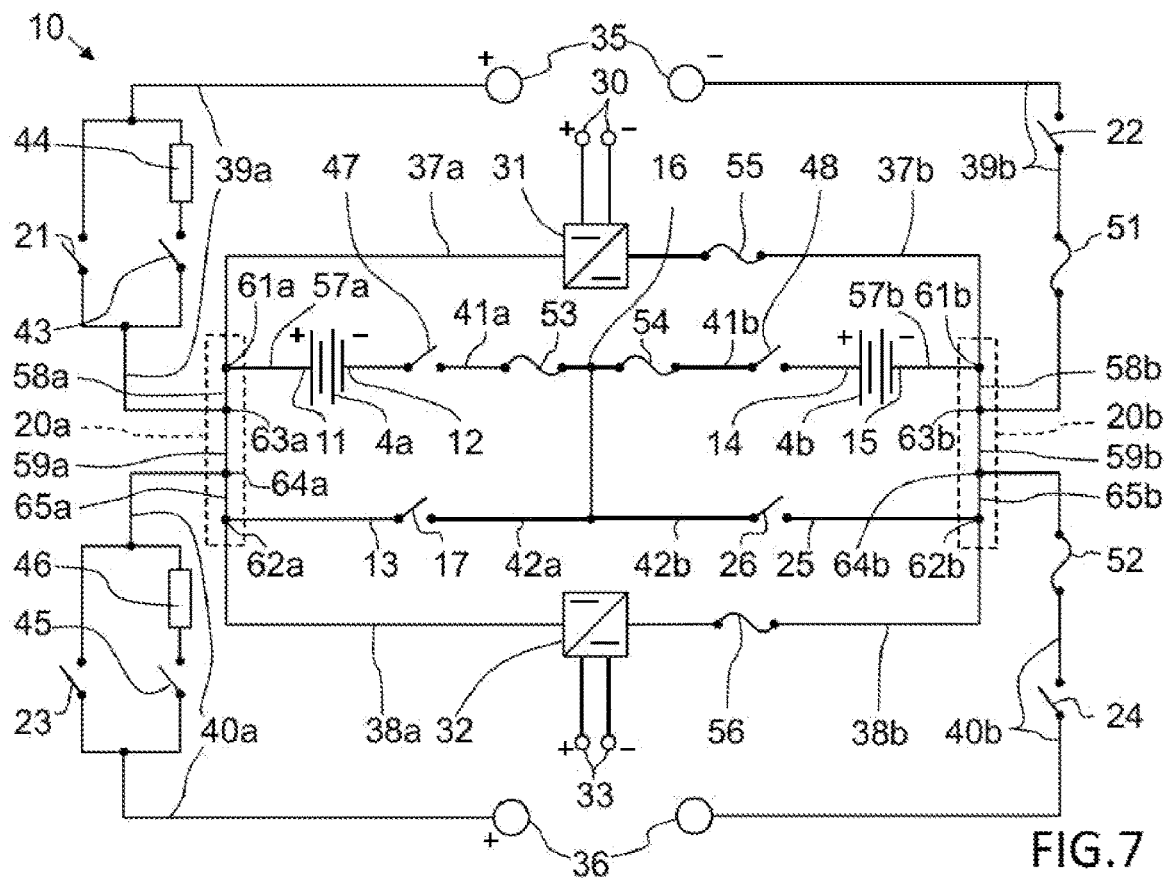
FIG. 7 shows schematically an example embodiment of the layout of the power supply system including a more detailed example embodiment of the positive and negative power distribution arrangements.

With reference to FIG. 7, each of the positive and negative power distribution arrangements 20a, 20b described above with reference to any of FIGS. 2-6 may include four individual power distribution units for connecting the positive terminal 11 of the first high-voltage battery unit 4a or the negative terminal 15 of the second high-voltage battery unit 4b, one of the first and second bypass lines 13, 25, the first and second DC/DC converters 31, 32, one of the first and second main contactors 21, 22, and one of the third and fourth main contactors 23, 24. Thereby, the risk for total power supply failure due to a single fault is even further reduced, because failure of a single individual power distribution units may with proper mutual connection merely result in loss of one or a few of the first and second low-voltage DC outputs 30, 33 and first and second high-voltage DC outputs 35, 36, such that the power supply system at least partly remain operational.

Specifically, with reference to FIG. 7, the positive power distribution arrangement 20a may according to some example embodiments include a first power distribution unit 61a joining a high-voltage cable or conductor 57a connected to or associated with the positive terminal 11 of the first high-voltage battery unit 4a and a high-voltage cable or conductor 37a connected to or associated with the first DC/DC converter 31.

Similarly, the negative power distribution arrangement 20b may according to some example embodiments include a first power distribution unit 61b joining a high-voltage cable or conductor 57b connected to or associated with the negative terminal 15 of the second high-voltage battery unit 4b, and a high-voltage cable or conductor 37b connected to or associated with the first DC/DC converter 31.

Furthermore, the positive power distribution arrangement 20a may according to some example embodiments include a second power distribution unit 62a joining a high-voltage cable or conductor 42a associated with the first bypass line 13, and a high-voltage cable or conductor 38a connected to or associated with the second DC/DC converter 32.

Similarly, the negative positive power distribution arrangement 20b may according to some example embodiments include a second power distribution unit 62b joining a high-voltage cable or conductor 42b associated with the second bypass line 25, and a high-voltage cable or conductor 38b connected to or associated with the second DC/DC converter 32.

Furthermore, the positive power distribution arrangement 20a may according to some example embodiments include a third power distribution unit 63a joining a high-voltage cable or conductor 58a connected to or associated with the first power distribution unit 61a, and a high-voltage cable or conductor 39a connected to or associated with the first main contactor 21.

Furthermore, the negative power distribution arrangement 20b may according to some example embodiments include a third power distribution unit 63b joining: a high-voltage cable or conductor 58b connected to or associated with the first power distribution unit 61b, a high-voltage cable or conductor 39b connected to or associated with the second main contactor 22.

Furthermore, the positive power distribution arrangement 20a may according to some example embodiments include a fourth power distribution unit 64a joining a high-voltage cable or conductor 59a connected to or associated with the third power distribution unit 63a, a high-voltage cable or conductor 65a connected to or associated with the second power distribution unit 62a, and a high-voltage cable or conductor 40a connected to or associated with the third main contactor 23.

Furthermore, the negative power distribution arrangement 20b may according to some example embodiments include a fourth power distribution unit 64b joining a high-voltage cable or conductor 59b connected to or associated with the third power distribution unit 63b, a high-voltage cable or conductor 65b connected to or associated with the second power distribution unit 62b, and a high-voltage cable or conductor 40b connected to or associated with the fourth main contactor 24.

Figure 8:
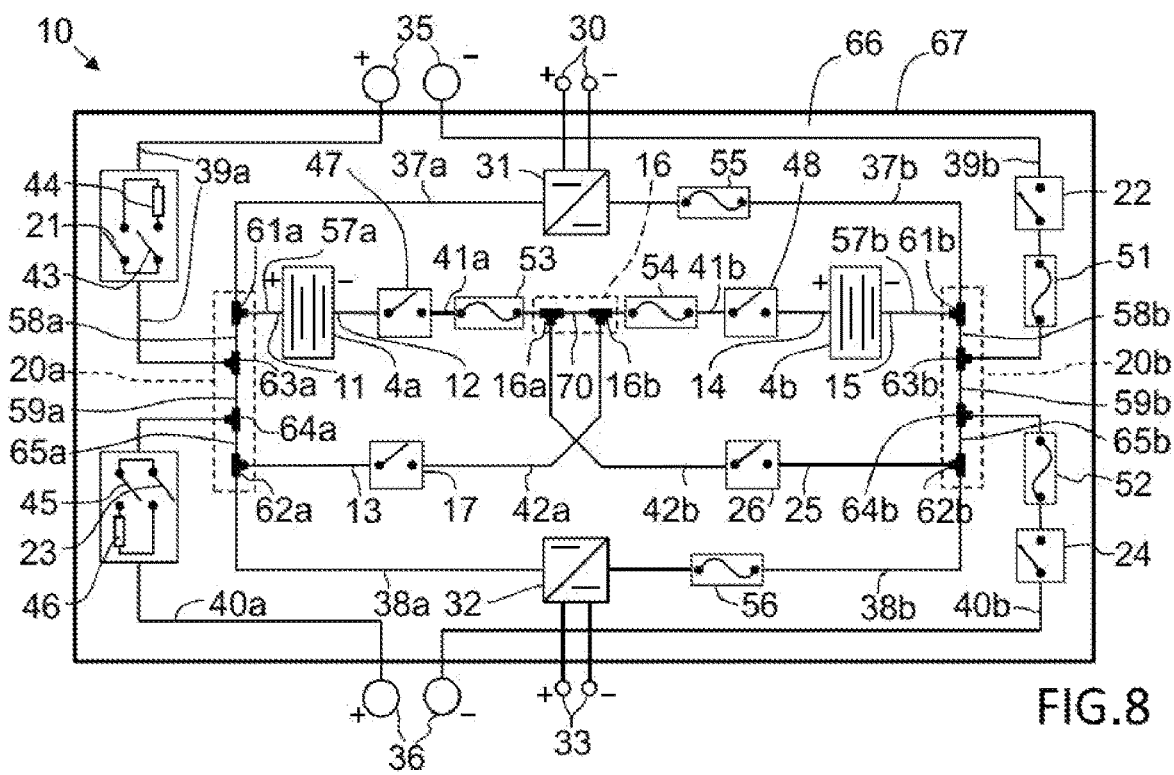
FIG. 8 shows schematically a slightly modified layout of the power supply system of FIG. 7.

FIG. 8 schematically shows a power supply system essentially similar to that described with reference to FIG. 7, but with slightly different symbols for reflecting some special features of some of the various electrical components. For example, the power supply system may according to some example embodiments be installed within an interior space 66 of a closed housing 67, and wherein the first and second low-voltage DC outputs 30, 33 and first and second high-voltage DC outputs 35, 36 are made available for connection on the outside of the housing 67. Having the power supply system installed within a housing enables good packing and compactness of the power supply system 10, as well as improved protection of the electrical components of the power supply system 10. Moreover, the housing also simplifies preassembly and transportation of the housing with integrated power supply system 10, thereby simplifying final assembly of the vehicle.

After installation of the housing with integrated power supply system 10 in the vehicle, attachments of low-voltage and high-voltage conductors or cables to the first and second low-voltage DC outputs 30, 33 and first and second high-voltage DC outputs 35, 36, respectively, may easily be performed via terminals of the first and second low-voltage DC outputs 30, 33 and first and second high-voltage DC outputs 35, 36 arranged accessible on the outside of the housing 67.

The housing 67 may for example be manufactured in a plastic or metallic material and may include the power supply system as described with reference to any the example embodiments of FIGS. 2-7. Moreover, the housing 67 may be sealed for reducing the risk of water entering the housing.

The housing 67 may for example have a relatively flat shape suitable for enabling installation of the housing under the cabin floor or trunk floor of the vehicle, or an elongated narrow shape suitable for enabling installation of the housing in the centre and along a longitudinal direction of the vehicle.

Furthermore, FIGS. 7 and 8 schematically shows an example embodiment of the power supply system, in which each of the first to fourth power distribution units 61a-64a, 61b-64b are embodied as an individual three-way connector, i.e. where each of the positive and negative power distribution arrangements 20a, 20b include four high-voltage three-way splitters each having three connection interfaces for receiving and mutually connecting three high-voltage conductors and/or high-voltage cables. The same may apply to the power supply systems described below with reference to FIGS. 9, 10, 14 and 15.

As briefly mentioned above, according to some example embodiments, the intermediate power distribution arrangement 16 may optionally be implemented in form of a multiple interconnected individual high-voltage power distribution units 16a, 16b, as schematically illustrated in FIG. 8. This arrangement may in certain situations further increase handling of single faults. For example, if the intermediate power distribution arrangement 16 would be designed as single high-voltage power distribution unit 16, e.g. a single high-voltage splitter, having for example three connection interfaces for receiving and mutually connecting the high-voltage conductors and/or cables associated with the first and second battery units 4a, 4b and the first and second bypass lines 13, 25, there might be a certain risk for failure of the this single high-voltage power distribution unit 16, for example due to mechanical or thermal failure, or the like, that could result in complete failure of this single high-voltage power distribution unit 16. Since the intermediate power distribution arrangement 16 is connected to both the first and second battery units 4a, 4b, as well as to the first and second bypass lines 13, 25, a single fault resulting in failure of this unit may completely shut down the power supply system.

However, if the intermediate power distribution arrangement 16 instead is implemented in form of for example a first and second interconnected individual high-voltage power distribution units 16a, 16b, as schematically illustrated in FIG. 8, wherein the first intermediate distribution unit 16a connects a high-voltage conductor or cable 41a associated with the first battery unit 4a, the second high-voltage electrical conductor or cable arrangement 42b associated with the second bypass line 25, and an intermediate high-voltage conductor or cable 70 interconnecting the first and second intermediate high-voltage power distribution units 16a, 16b, and wherein the second intermediate distribution unit 16b connects a high-voltage conductor or cable 41b associated with the second battery unit 4b, the first high-voltage electrical conductor or cable arrangement 42a associated with the first bypass line 13, and the intermediate high-voltage conductor or cable 70 interconnecting the first and second intermediate high-voltage power distribution units 16a, 16b, a single fault of one of the first and second intermediate high-voltage power distribution units 16a, 16b will not result in completely shut down the power supply system, because the other intermediate high-voltage power distribution unit 16a, 16b would still be intact and operational.

This type of intermediate power distribution arrangement 16 may alternatively be implemented and designed as a single high-voltage power distribution unit 16 having four connection interfaces for receiving and mutually connecting the high-voltage conductors and/or cables associated with the first and second battery units 4a, 4b and the first and second bypass lines 13, 25.

Figure 9:
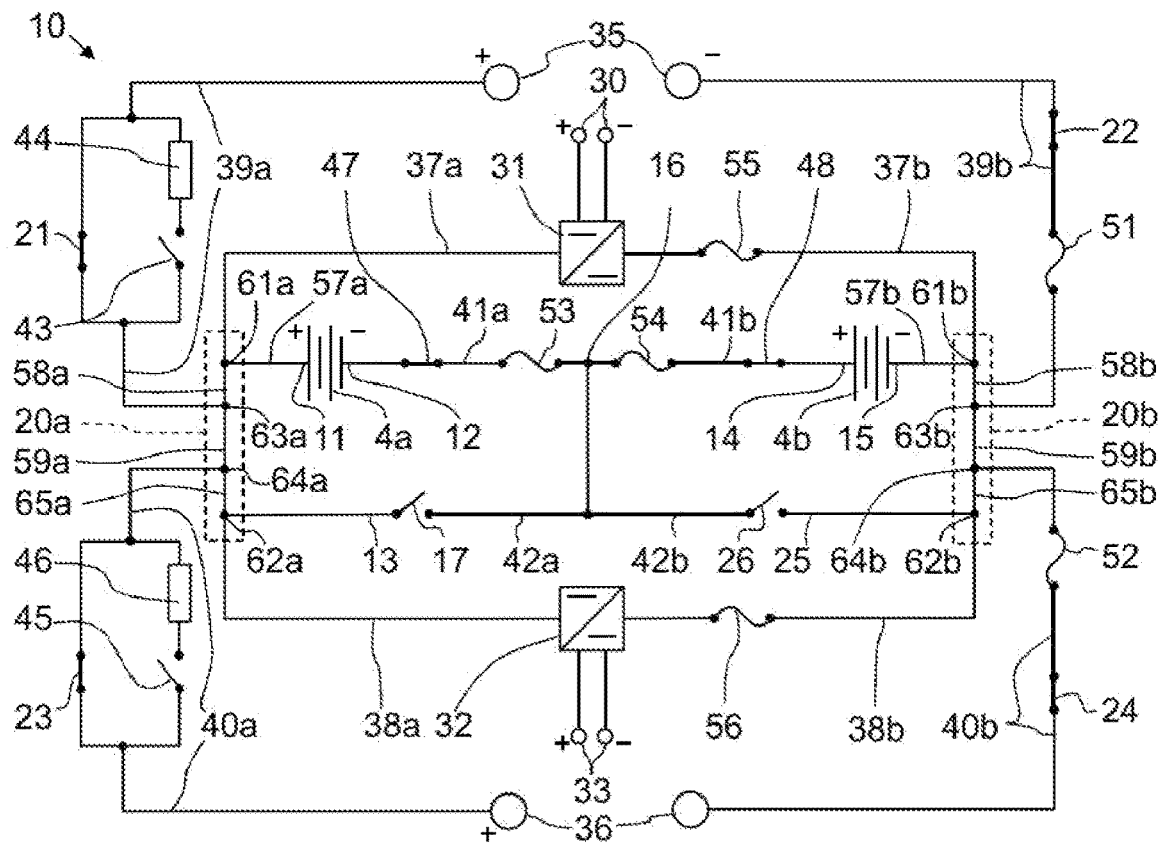
FIG. 9 shows the power supply system of FIG. 7 in a normal operating setting.

FIG. 9 shows the setting of the first to fourth main contactors 21-24, first and second precharge relays 43, 45, and first to fourth circuit breakers 17, 26, 47, 48 in normal operating settings, i.e. when the power supply system is fully functional and operating in steady state conditions.

Normal operating settings involves having each of the first to fourth main contactors 21-24 is a closed state, i.e. a conducting state, and each of the first and second precharge relays 43, 45 in an open state, i.e. a non-conductive state. Thereby, the power supply system can supply high-voltage power from the positive and negative power distribution arrangements 20a, 20b to the first and second high-voltage DC outputs 35, 36.

Moreover, normal operating settings further involves having each of the first and second circuit breakers 17, 26 in an open state, because there is no need for bypassing of any of the first and second battery units 4a, 4b via the first or second bypass lines 13, 25.

In addition, normal operating settings further involves having each of the third and fourth circuit breakers 47, 48 in a closed state, because both the first and second battery units 4a, 4b are functional and there is no need for bypassing any of the first and second battery units 4a, 4b via the first or second bypass lines 13, 25.

If for example the first battery unit 4a would fail and exhibit infinite impedance (open circuit), or if the third circuit breaker 47 would fail, or if the high-voltage conductor 41a connecting the positive power distribution arrangement 20a with the intermediate power distribution arrangement 16 would fail, then the first circuit breaker 17 would be controlled to close for enabling current to flow along the first bypass line 13 instead of via the first battery unit 4a.

If on the other hand the first battery unit 4a would suffer from capacity degradation, or thermal runaway, or for avoiding over discharge or over charge of the first battery unit 4a, or the like, the first circuit breaker 17 would be controlled to close for providing said first bypass line 13, and the third circuit breaker 47 would be controlled to open, thereby isolating the first battery unit 4a from an active part of the power supply system.

In all of these failure scenarios, each of the first and second low-voltage DC outputs 30, 33 would uphold supply of low-voltage DC power, as before, and each of the first and second high-voltage DC outputs 35, 36 would uphold supply of high-voltage DC output, but with a reduced voltage level.

If on the other hand the first DC/DC converter 31 would fail, or any of the high-voltage conductors or cables 37a, 37b connecting the positive and negative power distribution arrangements 20a, 20b with the first DC/DC converter 31 would fail, the first to fourth main contactors 21-24, first and second precharge relays 43, 45, and first to fourth circuit breakers 17, 26, 47, 48 would simply remain in normal operating settings, and the second low-voltage DC output 33 would uphold supply of low-voltage DC power, while each of the first and second high-voltage DC outputs 35, 36 would uphold supply of high-voltage DC output with constant high-voltage level.

If on the other hand any of the first or second man contactors 21, 22 would fail, or if any of the high-voltage conductors or cables 39a, 39b connecting the positive and negative power distribution arrangements 20a, 20b with the first high-voltage DC/DC output 35 would fail, the third and fourth main contactors 23, 24, first and second precharge relays 43, 45, and first to fourth circuit breakers 17, 26, 47, 48 would simply remain in normal operating settings, and both the first and second low-voltage DC outputs 30, 33 would uphold supply of low-voltage DC power, while the second high-voltage DC output 36 would uphold supply of high-voltage DC output with constant high-voltage level.

If for example the first power distribution unit 61a would fail, the first DC/DC converter 31 would lose supply of high-voltage power, and the first battery unit 4a would lose connection to the positive power distribution arrangements 20a via the high-voltage cable or conductor 57a connected to or associated with the positive terminal 11 of the first high-voltage battery unit 4a. The would cause a controller of the power supply system to close circuit breaker 17 for enabling current to flow along the first bypass line 13 instead of via the first battery unit 4a, such that the second DC/DC converter 32 would remain functional and supply electrical power at the second low-voltage DC output 33, while each of the first and second high-voltage DC outputs 35, 36 would uphold supply of high-voltage DC output but with reduced voltage level due to bypass of the first battery unit 4a.

If instead the high-voltage cable or conductor 58a connected to or associated with the first power distribution unit 61a, 61b would fail, the same scenario would occur, differing only in that also the first DC/DC converter 31 would remain functional and supply electrical power at the first low-voltage DC output 30.

If for example the second power distribution unit 62a would fail, the second DC/DC converter 32 would lose supply of high-voltage power, but the first to fourth main contactors 21-24, first and second precharge relays 43, 45, and first to fourth circuit breakers 17, 26, 47, 48 would simply remain in normal operating settings, and the first DC/DC converter 31 would remain functional and provide power at the first low-voltage DC output 30, while both high-voltage DC outputs 35, 36 would uphold supply of high-voltage DC output with constant high-voltage level. The same applies if the high-voltage cable or conductor 65a connected to or associated with the second power distribution unit 62a would fail.

If for example the third power distribution unit 63a would fail, the first high-voltage DC output would lose supply of high-voltage power, but the first DC/DC converter 31 would still receive high-voltage power from the series connected first and second high-voltage battery units 4a, 4b. Moreover, the controller would control the first circuit breaker 17 to close, thereby providing reduced level high-voltage power to the second DC/DC converter 32 and the second high-voltage DC output 36.

If instead the high-voltage cable or conductor 59a connected to or associated with the third power distribution unit 63a would fail, the same scenario would occur, differing only in that also the first high-voltage DC output 35 would enable supply of high-voltage DC power.

If instead for example the fourth power distribution unit 64a would fail, the second high-voltage DC output would lose supply of high-voltage power, but the first high-voltage DC output 35 and the first DC/DC converter 31 would still receive high-voltage power from the series connected first and second high-voltage battery units 4a, 4b. Moreover, the controller would control the first circuit breaker 17 to close, thereby providing reduced level high-voltage power to the second DC/DC converter 32.

Many alternative configurations of the power supply system is possible. For example, as schematically illustrated in FIG. 10, the attachment location of the first and second high-voltage DC outputs 35, 35 at the positive and negative power distribution arrangements 20a, 20b may be switched with the attachment locations of the first and second DC/DC converters 31, 32 at said positive and negative power distribution arrangements 20a, 20b.

In other words, each of the positive and negative power distribution arrangements 20a, 20b includes a first power distribution unit 6a, 61b joining a high-voltage cable or conductor 57a, 57b connected to or associated with the positive terminal 11 of the first high-voltage battery unit 4a or the negative terminal 15 of the second high-voltage battery unit 4b, and a high-voltage cable or conductor 39a, 39b connected to or associated with the first or second main contactors 21, 22.

Figure 10:
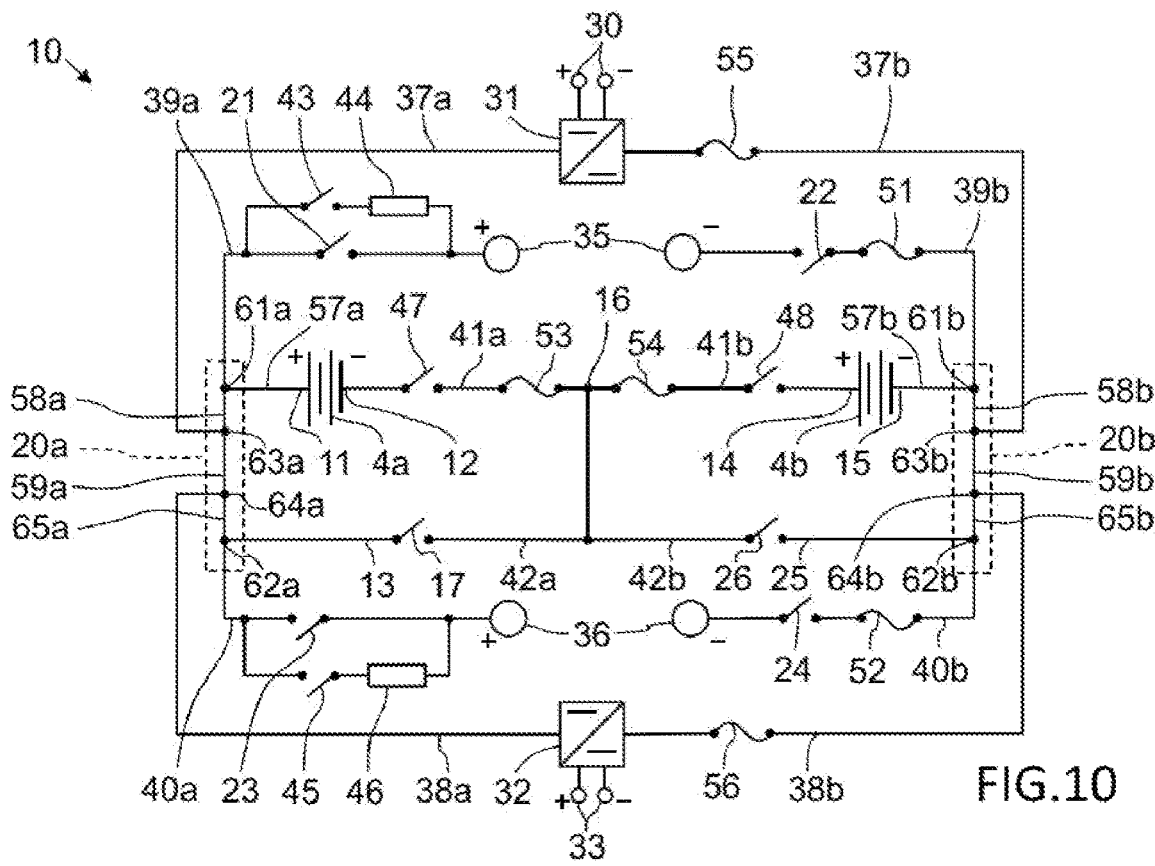
FIG. 10-14 show schematically various alternative or modified example embodiments of the power supply system according to the disclosure.

Moreover, with reference to FIG. 10, each of the positive and negative power distribution arrangements 20a, 20b includes a second power distribution unit 62a, 62b joining: a high-voltage cable or conductor 38a, 38b associated with the first or second bypass line 13, 25, and a high-voltage cable or conductor 40a, 40b connected to or associated with the third or fourth main contactors 23, 24.

Moreover, with reference again to the example embodiment of FIG. 10, each of the positive and negative power distribution arrangements 20a, 20b may include a third power distribution unit joining 63a, 63b a high-voltage cable or conductor 58a, 58b connected to or associated with the first power distribution unit 61a, 61b, and a high-voltage cable or conductor 37a, 37b connected to or associated with the first DC/DC converter 31.

Moreover, with reference again to the example embodiment of FIG. 10, each of the positive and negative power distribution arrangements 20a, 20b includes a fourth power distribution unit 64a, 64b joining a high-voltage cable or conductor 59a, 59b connected to or associated with the third power distribution unit 63a, 63b, the high-voltage cable or conductor 65a, 65b connected to or associated with the second power distribution unit 62a, 62b, and a high-voltage cable or conductor 40a, 40b connected to or associated with the second DC/DC converter 32.

The specific layout of the each of the positive and negative power distribution arrangements 20a, 20b of the power supply system 10 according to the example embodiment of FIG. 10 results in a different internal power supply priority within the power supply system, and an advantageous layout may be selected according to the specific circumstances of each implementation.

Still a further example embodiment of the power supply system 10 is described with reference to FIG. 11, wherein each of the positive and negative power distribution arrangements 20, 20b includes fewer individual power distribution units, e.g. at least one four-way individual power distribution unit, and in particular two four-way individual power distribution units.

Figure 11:
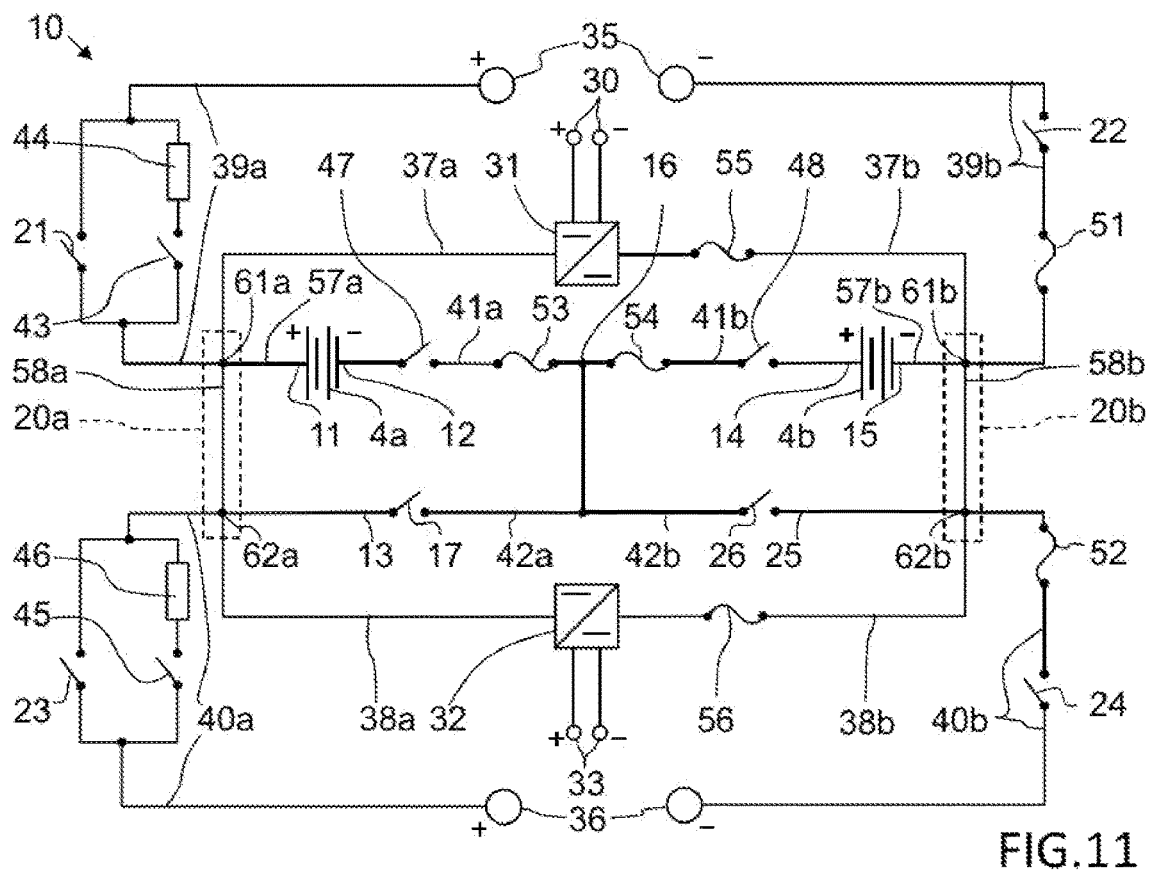

More in detail, with reference to FIG. 11, each of the positive and negative power distribution arrangements 20a, 20b may according to this example embodiment include a first power distribution unit 61a, 61b joining a high-voltage cable or conductor 57a, 57b connected to or associated with the positive terminal 11 of the first high-voltage battery unit 4a or the negative terminal 15 of the second high-voltage battery unit 4b, and a high-voltage cable or conductor 37a, 37b connected to or associated with the first DC/DC converter 31, and a high-voltage cable or conductor 39a, 39b connected to or associated with the first or second main contactors 21, 22.

Furthermore, each of the positive and negative power distribution arrangements 20a, 20b may according to this example embodiment additionally include a second power distribution unit joining 62a, 62b joining a high-voltage cable or conductor 42a, 42b associated with the first or second bypass line 13, 25, and a high-voltage cable or conductor 38a, 38b connected to or associated with the second DC/DC converter 32, and a high-voltage cable or conductor 40a, 40b connected to or associated with the third or fourth main contactors 23, 24.

Consequently, each of the positive and negative power distribution arrangements 20a, 20b may for example include two individual four-way connectors 61a, 61b, 62a, 62b.

Still a further example embodiment of the power supply system 10 is described with reference to FIG. 12, wherein each of the positive and negative power distribution arrangements 20, 20b includes merely a single individual power distribution unit, such as for example a six-way individual power distribution unit.

Figure 12:
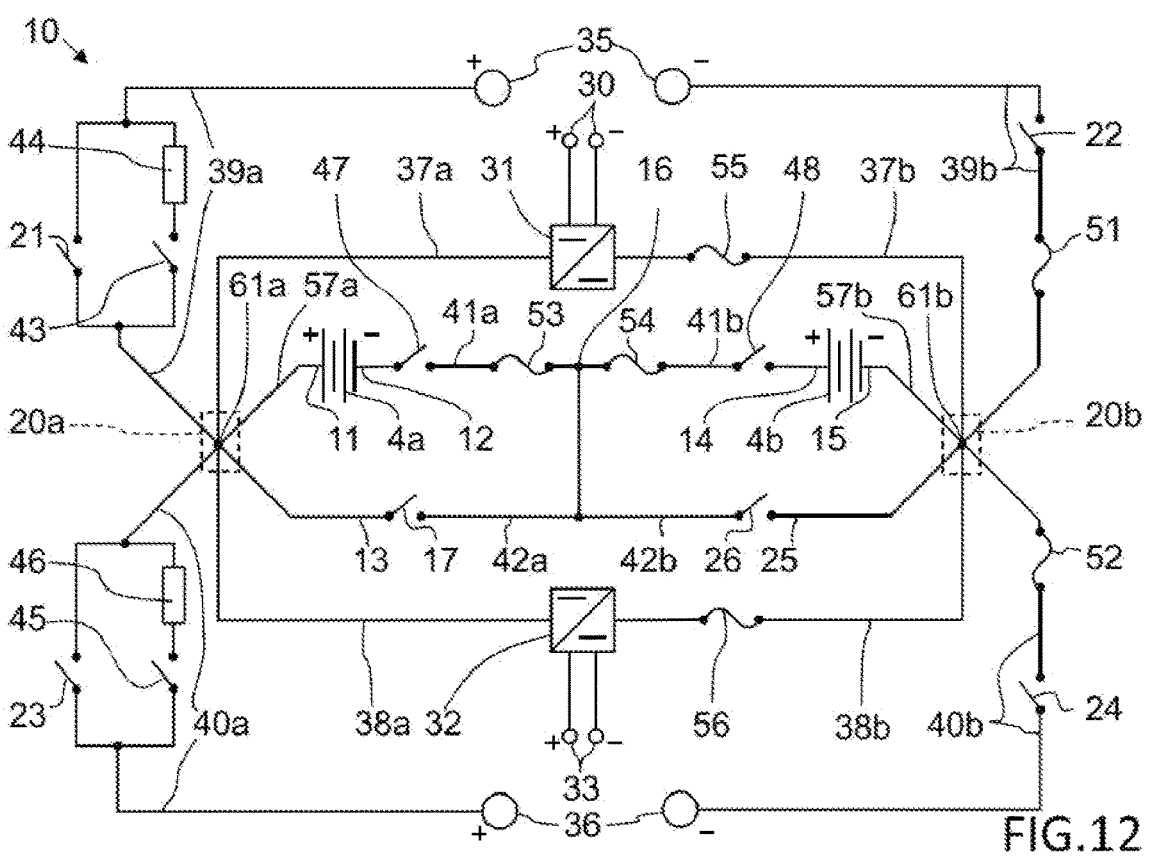

More in detail, with reference to FIG. 12, each of the positive and negative power distribution arrangements 20a, 20b may according to this example embodiment include a first power distribution unit 61a, 61b joining a high-voltage cable or conductor 57a, 57b connected to or associated with the positive terminal 11 of the first high-voltage battery unit 4a or the negative terminal 15 of the second high-voltage battery unit 4b, and a high-voltage cable or conductor 37a, 37b connected to or associated with the first DC/DC converter 31, and a high-voltage cable or conductor 39a, 39b connected to or associated with the first or second main contactors 21, 22, and a high-voltage cable or conductor 42a, 42b associated with the first or second bypass line 13, 25, and a high-voltage cable or conductor 38a, 38b connected to or associated with the second DC/DC converter 32, and a high-voltage cable or conductor 40a, 40b connected to or associated with the third or fourth main contactors 23, 24.

This layout of the positive and negative power distribution arrangements 20, 20b is less complicated with fewer individual power distribution units, but may instead require longer high-voltage cables and being more susceptible to complete power supply failure in case of failure of one of the first power distribution units 61a, 61b.

Figure 13:
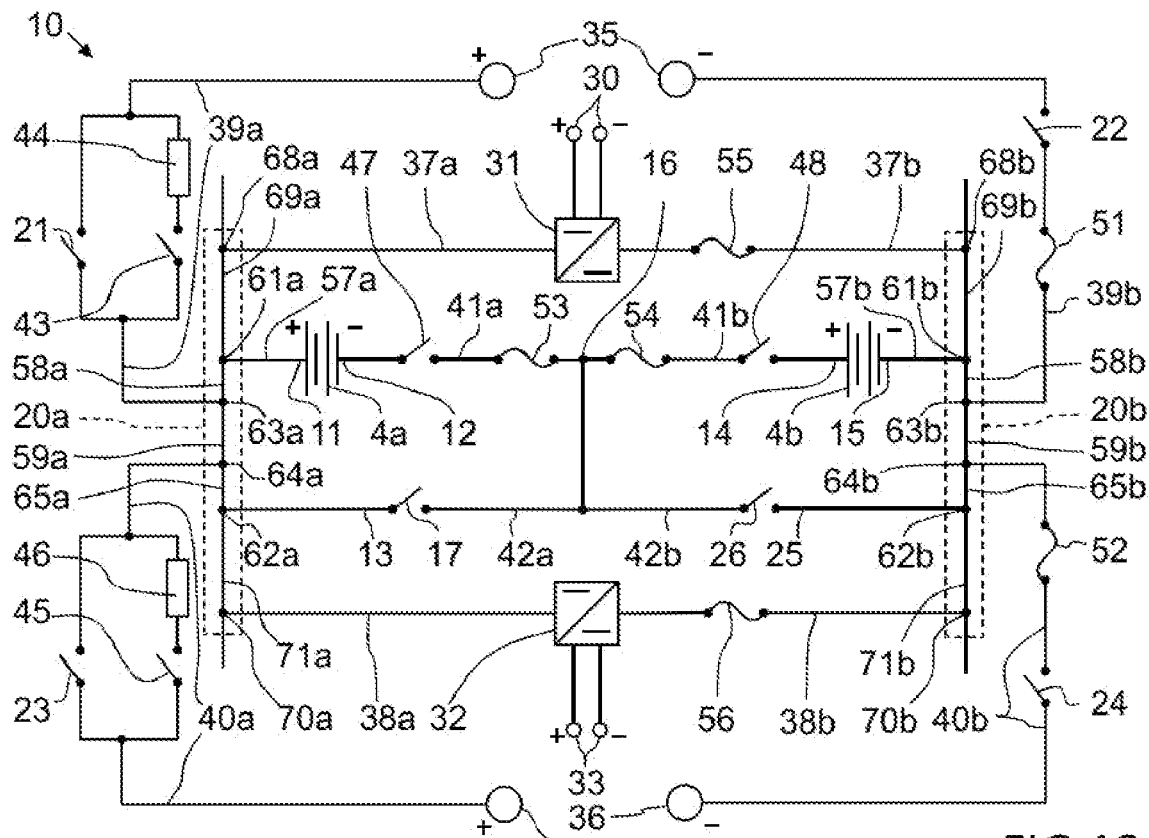

Still a further example embodiment of the power supply system 10 is described with reference to FIG. 13, which shows a power supply layout similar to that described with reference to FIG. 7, and differing only in that positive and negative power distribution arrangements 20, 20 may be connected to even further electrical high-voltage components of the power supply system, such as further battery units, battery charging connectors, voltage sensors associated with a power supply system micro controller, etc. Hence, the positive and negative power distribution arrangements 20, 20b may in such a scenario include even more individual power distribution units.

For example, according to some example embodiments, the positive and negative power distribution arrangements 20a, 20b may additionally include a fifth power distribution unit 68a, 68b joining a high-voltage cable or conductor 69a, 69b connected to or associated with the first power distribution unit 61a, 61b, and a high-voltage cable or conductor 37a, 37b connected to or associated with the first DC/DC converter 31 or a high-voltage cable or conductor 39a, 39b connected to or associated with any of the first and second main contactors 21, 22.

Similarly, according to some example embodiments, the positive and negative power distribution arrangements 20a, 20b may additionally include a sixth power distribution unit 70a, 70b joining a high-voltage cable or conductor 71a, 71b connected to or associated with the second power distribution unit 62a, 62b, and a high-voltage cable or conductor 37a, 37b connected to or associated with the second DC/DC converter 31 or a high-voltage cable or conductor 40a, 40b connected to or associated with any of the third and fourth main contactors 23, 24.

Figure 14:
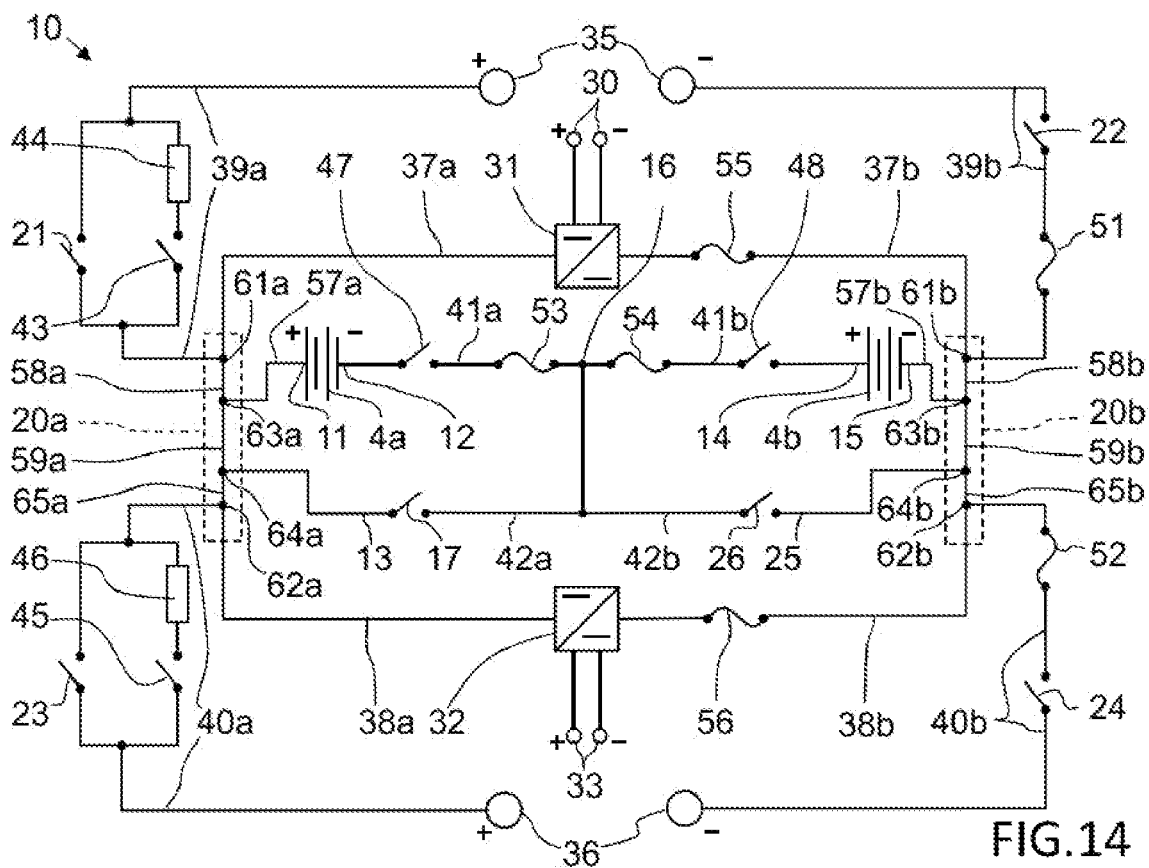

FIG. 14 shows still a further example embodiment of the power supply system, that differs from the power supply system described with reference to FIG. 7 mainly in terms of the layout and connections of the positive and negative power distribution arrangements 20a, 20b.

Specifically, each of the positive and negative power distribution arrangements 20, 20b includes a first power distribution unit 61a, 61b joining a high-voltage cable or conductor 37a, 37b connected to or associated with the first DC/DC converter 31 and a high-voltage cable or conductor 39a, 39b connected to or associated with the first or second main contactors 21, 22.

Moreover, each of the positive and negative power distribution arrangements 20, 20b may further include a second power distribution unit 62a, 62b joining a high-voltage cable or conductor 38a, 38b connected to or associated with the second DC/DC converter 32 and a high-voltage cable or conductor 40a, 40b connected to or associated with the third or fourth main contactors 23, 24.

In addition, each of the positive and negative power distribution arrangements 20a, 20b may further include a third power distribution unit 63a, 63b joining a high-voltage cable or conductor 58a, 58b connected to or associated with the first power distribution unit 61a, 61b and a high-voltage cable or conductor connected 57a, 57b to or associated with the positive terminal 11 of the first high-voltage battery unit 4a or the negative terminal 15 of the second high-voltage battery unit 4b.

Furthermore, each of the positive and negative power distribution arrangements 20a, 20b may further include a fourth power distribution unit 64a, 64b joining a high-voltage cable or conductor 59a, 59b connected to or associated with the third power distribution unit 63a, 63b, and a high-voltage cable or conductor 65a, 65b connected to or associated the second power distribution unit 62a, 62b, and a high-voltage cable or conductor 42a, 42b associated with the first or second bypass lines 13, 25.

This specific layout of the each of the positive and negative power distribution arrangements 20a, 20b results in still a different internal power supply priority within the power supply system, and an advantageous layout may be selected according to the specific circumstances of each implementation.

With reference to FIG. 15, the disclosure also relates to an electrical drivetrain 75 for a vehicle comprising the vehicle power supply system 10 as described above. In the example embodiment of the vehicle electric drivetrain schematically illustrated in FIG. 15, the electrical drivetrain comprises a first electrical traction motor 5a connected to the first high-voltage DC output 35 via a first power converter 76, and a second electrical traction motor 5b connected to the second high-voltage DC output 36 via a second power converter 77.

The first and second electrical traction motors 5a, 5b may for example be drivingly connected to the front and rear wheels 2a, 2b, respectively, or to the left and right rear wheels 2b, respectively, for enabling positive torque vectoring. Still more alternatively, both the first and second high-voltage DC outputs 35, 36 may be drivingly connected to the same electrical traction motor (not showed) for providing at least redundant power supply to said electrical traction motor.

One or both of the first and second electrical traction motors 5a, 5b may for example be three-phase AC inductive motor or three-phase AC permanent-magnet motor, a servo motor, a DC motor, etc. The first and/or second power converters 76, 77 may for example be an inverter for controlling speed of an AC motor, or a DC/DC power converter for controlling speed of a DC motor.

With reference to FIGS. 1 and 15, the disclosure also relates to a vehicle 1 comprising an electrical drivetrain 75 as described above. In particular vehicles configured for more or less autonomous driving, redundancy in certain safety-critical systems such as braking and steering may be deemed desirable.

As schematically illustrated in FIG. 15, the vehicle 1 may according to some example embodiments include a fully-redundant system layout having independent first and second actuators for controlling certain safety-critical systems, where a second actuator automatically can take over if there is a fault with the first actuator.

This may for example be implemented by proving the vehicle 1 with a first electrical power steering module 80 connected to the first low-voltage DC output 30 via a first low-voltage distribution network 84, and a second electrical power steering module 81 connected to the second low-voltage DC output 33 via a second low-voltage distribution network 85, wherein each of the first and second electrical power steering modules 80, 81 include an individual steering actuator, such as an electrical motor drivingly connected to the mechanical steering mechanism of the vehicle, for enabling fully redundant and autonomous steering assistance.

As a result, a fail-operational steering function is provided that enables either a driver or autopilot system to make a safe stop in the rare case of a single failure within the electrical power supply system 10 or one of the first and second electrical power steering modules 80, wherein the fully-redundant system layout enables a second actuator to take over steering control if there is a fault with the first steering actuator or lack of a power supply at the first low-voltage DC output 30.

By analogy, the vehicle 1 may according to some example embodiments include a fully-redundant braking system layout having independent first and second braking actuators, where a second braking actuator automatically can take over if there is a fault with the first braking actuator. This may for example be implemented by proving the vehicle 1 with a first electrical braking module 82 connected to the first low-voltage DC output 30, and a second electrical braking module 83 connected to the second low-voltage DC output 33, wherein each of the first and second electrical braking modules 80, 81 include an individual braking actuator for enabling fully redundant and autonomous vehicle braking assistance.

Alternatively, the vehicle may include a single electrical power steering module and/or a single electrical braking module (not showed), each being connected to both the first and second low-voltage DC outputs 30, 33 for providing at least redundant power supply to said single electrical power steering module and/or a single electrical braking module.

The term "high-voltage" used herein refers generally to a voltage level above 60 V, specifically at least 100 V, and more specifically in the range of 150-1500 V. The term "low-voltage" used herein refers generally to a voltage level below 60 V, specifically in the range of 12-50 V.

With reference to FIG. 16, the disclosure also relates to a method for supplying redundant high-voltage and low-voltage electrical power to an electric vehicle or a hybrid-electric vehicle. The method comprises a first step S1 of providing first and second series connected high-voltage battery units 4a, 4b mutually interconnected via an intermediate power distribution arrangement 16 and connected to a positive power distribution arrangement 20a and a negative power distribution arrangement 20b, providing a first bypass line 13 including a first circuit breaker 17, wherein the first bypass line 13 is connected to the positive power distribution arrangement 20a and to the intermediate power distribution arrangement 16), and providing a second bypass line 25 including a second circuit breaker 26, wherein the second bypass line 25 is connected to the negative power distribution arrangement 20b and to the intermediate power distribution arrangement 16.

The method further comprises a second step S2 of supplying low-voltage DC at a first low-voltage DC output 30 via a first DC/DC converter 31 that is connected to the positive and negative power distribution arrangements 20a, 20b and/or supplying low-voltage DC at a second low-voltage DC output 33 via a second DC/DC converter 32 that is connected to the positive and negative power distribution arrangements 20a, 20b, and supplying high-voltage DC at a first high-voltage DC output 35 via first and second main contactors 21, 22 that are connected to the positive and negative power distribution arrangements 20a, 20b and/or supplying high-voltage DC at a second high-voltage DC output 36 via third and fourth main contactors 23, 24 that are connected to the positive and negative power distribution arrangements 20a, 20b.

In other words, the method may according to an example embodiment of the disclosure involve simultaneous supply of low-voltage DC at both the first and second low-voltage DC outputs 30, 33, as well as simultaneous supply of high-voltage DC at both the first and second high-voltage DC outputs 35, 36. This may occur when the power supply system includes at least two low-voltage loads that are operated simultaneously and powered by individual DC/DC converters 31, 32, and at least two high-voltage loads that are also operated simultaneously and connected to individual high-voltage DC outputs 35, 36.

Alternatively, the method may according to a further example embodiment of the disclosure involve supply of low-voltage DC by only the first low-voltage DC output 30, while the second low-voltage DC output 33 is redundant and set in a passive, mode, and only activated in case of supply failure by the first low-voltage DC output 30.

Similarly, the method may according to a further example embodiment of the disclosure involve supply of high-voltage DC by only the first high-voltage DC output 35, while the second high-voltage DC output 36 is redundant and set in a passive, mode, and only activated in case of supply failure by the first high-voltage DC output 30.

It will be appreciated that the above description is merely exemplary in nature and is not intended to limit the present disclosure, its application or uses.

While specific examples have been described in the specification and illustrated in the drawings, it will be understood by those of ordinary skill in the art that various changes may be made and equivalents may be substituted for elements thereof without departing from the scope of the present disclosure.

In particular, the various features of the different example embodiments described herein may be combined to provide new combinations of features that are not explicitly described herein for avoiding a drawn-out and unconcise disclosure, but nevertheless included in the scope of the disclosure.

For example, the features relating to the first and second precharge relays 43, 45 and associated precharge resistors 44, 46 described with reference to FIG. 3 may be included or omitted in any of the other example embodiments described herein, and the features relating to third and fourth circuit breakers 47, 48 described with reference to FIG. 4 may also be included or omitted in any of the other example embodiments described herein. By analogy, the features relating to fuse arrangement including first to fourth fuses 51-54 described with reference to FIG. 5, and/or the features relating to fuse arrangement including also fifth and sixth fuses 55, 56 described with reference to FIG. 6 may be included or omitted in any of the other example embodiments described herein. Moreover, the features relating to the layout of the intermediate power distribution arrangement 16 described with reference to FIG. 8, and/or the features relating to the housing 67 also described with reference to FIG. 8, may also be included or omitted in any of the other example embodiments described herein. In addition, the features relating to the drivetrain described with reference to FIG. 15 and/or the features relating to the redundant safety-critical modules 80-83 also described with reference to FIG. 15, may be included or omitted in any of the other example embodiments described herein.

Moreover, the disclosure include several different embodiments of the positive and negative power distribution arrangements 20a, 20b, in particular a 1st detailed layout of the positive and negative power distribution arrangements 20a, 20b described with reference to FIG. 7 and FIG. 8, a 2nd detailed layout of positive and negative power distribution arrangements 20a, 20b is described with reference to FIG. 10, a 3rd detailed layout of positive and negative power distribution arrangements 20a, 20b is described with reference to FIG. 11, a 4th detailed layout of positive and negative power distribution arrangements 20a, 20b is described with reference to FIG. 12, a 5th detailed layout of positive and negative power distribution arrangements 20a, 20b is described with reference to FIG. 13, and a 6th detailed layout of positive and negative power distribution arrangements 20a, 20b is described with reference to FIG. 14. It is envisaged that any of these various example embodiments of positive and negative power distribution arrangements 20a, 20b may be implemented in the power supply system described with reference to any of FIGS. 2-6 and 15.

Furthermore, modifications may be made to adapt a particular situation or material to the teachings of the present disclosure without departing from the essential scope thereof.

Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

What is claimed is:

1. A vehicle power supply system configured for providing redundant high-voltage and low-voltage power supply for an electric vehicle or hybrid-electric vehicle, the power supply system comprising:
   a first high-voltage battery unit having a positive terminal and a negative terminal, wherein the positive terminal is connected to a positive power distribution arrangement,
   a second high-voltage battery unit having a positive terminal and a negative terminal, wherein the positive terminal is connected to the negative terminal of the first high-voltage battery unit via an intermediate power distribution arrangement, and wherein the negative terminal is connected to a negative power distribution arrangement,
   a first bypass line connecting the positive power distribution arrangement with the intermediate power distribution arrangement, wherein the first bypass line includes a first circuit breaker, a second bypass line connecting the negative power distribution arrangement with the intermediate power distribution arrangement, wherein the second bypass line includes a second circuit breaker, a first DC/DC converter connected to the positive and negative power distribution arrangements and configured for providing a first low-voltage DC output, a second DC/DC converter connected to the positive and negative power distribution arrangements and configured for providing a second low-voltage DC output, a first main contactor connected to the positive power distribution arrangement and a second main contactor connected to the negative power distribution arrangement, wherein the first and second main contactors in engaged state are configured for connecting the first and second high-voltage battery units with a first high-voltage DC output, and in disengaged state configured for disconnecting the first and second high-voltage battery unit from the first high-voltage DC output, a third main contactor connected to the positive power distribution arrangement and a fourth main contactor connected to the negative power distribution arrangement, wherein the third and fourth main contactors in engaged state are configured for connecting the first and second high-voltage battery units with a second high-voltage DC output, and in disengaged state configured for disconnecting the first and second high-voltage battery units from the second high-voltage DC output.

2. The vehicle power supply system according to claim 1, wherein each of the positive and negative power distribution arrangements include one, two, three, four, five or six individual power distribution units for connecting:
the positive terminal of the first high-voltage battery unit or the negative terminal of the second high-voltage battery unit,
one of the first and second bypass lines,
the first and second DC/DC converters,
one of the first and second main contactors, and
one of the third and fourth main contactors.

3. The vehicle power supply system according to claim 1, wherein each of the positive and negative power distribution arrangements includes a first power distribution unit joining:
a high-voltage cable or conductor connected to or associated with the positive terminal of the first high-voltage battery unit or the negative terminal of the second high-voltage battery unit, and
a high-voltage cable or conductor connected to or associated with the first DC/DC converter, and/or a high-voltage cable or conductor connected to or associated with the first or second main contactors.

4. The vehicle power supply system according to claim 3, wherein each of the positive and negative power distribution arrangements includes a second power distribution unit joining:
a high-voltage cable or conductor associated with the first or second bypass lines, and
a high-voltage cable or conductor connected to or associated with the second DC/DC converter, and/or a high-voltage cable or conductor connected to or associated with the third or fourth main contactors.

5. The vehicle power supply system according to claim 4, wherein each of the positive and negative power distribution arrangements includes a third power distribution unit joining:
a high-voltage cable or conductor connected to or associated with the first power distribution unit, and
a high-voltage cable or conductor connected to or associated with the first or second main contactors or a high-voltage cable or conductor connected to or associated with the first DC/DC converter.

6. The vehicle power supply system according to claim 5, wherein each of the positive and negative power distribution arrangements includes a fourth power distribution unit joining:
a high-voltage cable or conductor connected to or associated with the third power distribution unit,
a high-voltage cable or conductor connected to or associated with the second power distribution unit, and
a high-voltage cable or conductor connected to or associated with the third or fourth main contactors or a high-voltage cable or conductor connected to or associated with the second DC/DC converter.

7. The vehicle power supply system according to claim 1, wherein each of the positive and negative power distribution arrangements includes:
a first power distribution unit joining a high-voltage cable or conductor connected to or associated with the first DC/DC converter and a high-voltage cable or conductor connected to or associated with the first or second main contactors, and
a second power distribution unit joining a high-voltage cable or conductor connected to or associated with the second DC/DC converter and a high-voltage cable or conductor connected to or associated with the third or fourth main contactors.

8. The vehicle power supply system according to claim 7, wherein each of the positive and negative power distribution arrangements includes:
a third power distribution unit joining a high-voltage cable or conductor connected to or associated with the first power distribution unit and a high-voltage cable or conductor connected to or associated with the positive terminal of the first high-voltage battery unit or the negative terminal of the second high-voltage battery unit, and
a fourth power distribution unit joining a high-voltage cable or conductor connected to or associated with the third power distribution unit, a high-voltage cable or conductor connected to or associated with the second power distribution unit, and a high-voltage cable or conductor associated with the first or second bypass lines.

9. The vehicle power supply system according to claim 1, wherein the vehicle power supply system further comprises a third circuit breaker connected in series with the first high-voltage battery unit and configured for enabling selective connection and disconnection of the first high-voltage battery unit from the vehicle power supply system, and a fourth circuit breaker connected in series with the second high-voltage battery unit and configured for enabling selective connection and disconnection of the second high-voltage battery unit from the vehicle power supply system.

10. The vehicle power supply system according to claim 1, wherein the vehicle power supply system further comprises a first fuse connected in series with the first or second main contactors, a second fuse connected in series with the third or fourth main contactors, a third fuse connected in series with the first high-voltage battery unit, and a fourth fuse connected in series with the second high-voltage battery unit, wherein the first and second fuses have lower rated current value than the third and fourth fuses.

11. The vehicle power supply system according to claim 10, wherein the first fuse has a rated current value differing at least 5%, specifically at least 10%, and more specifically at least 20%, from the rated current value of the second fuse, and/or wherein the third fuse has a rated current value differing at least 5%, specifically at least 10%, and more specifically at least 20%, from the rated current value of the fourth fuse.

12. The vehicle power supply system according to claim 10, wherein the vehicle power supply system further comprises a fifth fuse connected in series with the first DC/DC converter and a sixth fuse connected in series with the second DC/DC converter, wherein the fifth fuse has a rated current value differing at least 5%, specifically at least 10%, and more specifically at least 20%, from the rated current value of the sixth fuse.

13. An electrical drivetrain for a vehicle comprising the vehicle power supply system according to claim 1, wherein the electrical drivetrain comprises a first electrical traction motor connected to the first high-voltage DC output via a first power converter and a second electrical traction motor connected to the second high-voltage DC output via a second power converter.

14. A vehicle comprising the electrical drivetrain according to claim 13.

15. A method for supplying redundant high-voltage and low-voltage electrical power to an electric vehicle or a hybrid-electric vehicle, the method comprising:
providing first and second series connected high-voltage battery units mutually interconnected via an intermediate power distribution arrangement and connected to a positive power distribution arrangement and a negative power distribution arrangement, providing a first bypass line including a first circuit breaker, wherein the first bypass line is connected to the positive power distribution arrangement and to the intermediate power distribution arrangement, and providing a second bypass line including a second circuit breaker, wherein the second bypass line is connected to the negative power distribution arrangement and to the intermediate power distribution arrangement,
supplying low-voltage DC at a first low-voltage DC output via a first DC/DC converter that is connected to the positive and negative power distribution arrangements and/or supplying low-voltage DC at a second low-voltage DC output via a second DC/DC converter that is connected to the positive and negative power distribution arrangements, and supplying high-voltage DC at a first high-voltage DC output via first and second main contactors that are connected to the positive and negative power distribution arrangements and/or supplying high-voltage DC at a second high-voltage DC output via third and fourth main contactors that are connected to the positive and negative power distribution arrangements.

* * * * *